United States Patent
Tanimoto

(10) Patent No.: US 10,861,135 B2
(45) Date of Patent: Dec. 8, 2020

(54) IMAGE PROCESSING APPARATUS, NON-TRANSITORY COMPUTER-READABLE RECORDING MEDIUM STORING COMPUTER PROGRAM, AND IMAGE PROCESSING METHOD

(71) Applicant: Olympus Corporation, Hachioji (JP)

(72) Inventor: Tetsushi Tanimoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 135 days.

(21) Appl. No.: 16/367,196

(22) Filed: Mar. 27, 2019

(65) Prior Publication Data

US 2019/0370937 A1    Dec. 5, 2019

(30) Foreign Application Priority Data

May 30, 2018    (JP) .................................. 2018-103388

(51) Int. Cl.

| | | |
|---|---|---|
| *G06T 3/40* | (2006.01) | |
| *G06T 5/50* | (2006.01) | |
| *G06T 7/00* | (2017.01) | |
| *G06T 7/33* | (2017.01) | |
| *H04N 5/232* | (2006.01) | |
| *G06T 7/20* | (2017.01) | |

(52) U.S. Cl.
CPC .............. *G06T 3/4053* (2013.01); *G06T 5/50* (2013.01); *G06T 7/0002* (2013.01); *G06T 7/20* (2013.01); *G06T 7/33* (2017.01); *H04N 5/23232* (2013.01); *G06T 2207/20221* (2013.01); *G06T 2207/30168* (2013.01)

(58) Field of Classification Search
CPC ....... G06T 3/4053; G06T 5/50; G06T 7/0002; G06T 7/33; G06T 7/20; G06T 2207/20221; G06T 2207/30168; G06T 2207/10016; G06T 7/74; G06T 7/238; G06T 3/4069; H04N 5/23232
See application file for complete search history.

(56) References Cited

U.S. PATENT DOCUMENTS

| | | | |
|---|---|---|---|
| 2006/0012830 A1* | 1/2006 | Aiso ..................... | G06T 3/4053 358/3.27 |
| 2012/0321185 A1* | 12/2012 | Toda ..................... | G06T 3/4053 382/167 |
| 2016/0171658 A1* | 6/2016 | Matson ................... | G06T 5/003 382/299 |

FOREIGN PATENT DOCUMENTS

JP    2004-242010 A    8/2004

* cited by examiner

*Primary Examiner* — Phuoc Tran
(74) *Attorney, Agent, or Firm* — John C. Pokotylo; Pokotylo Patent Services

(57) ABSTRACT

An image processing apparatus including a pixel shifting super-resolution image generation circuit configured to generate a high-resolution composite image from a plurality of images, an evaluation area setting circuit configured to set a plurality of evaluation areas within an area extraction range of the composite image, a synthesis accuracy evaluation circuit configured to evaluate, for each of the plurality of evaluation areas, a pixel filling rate for the evaluation area and calculate a plurality of pixel filling rate evaluation values, and a determination circuit configured to determine a determination area from among the plurality of evaluation areas based on the plurality of pixel filling rate evaluation values.

12 Claims, 22 Drawing Sheets

FIG. 14

| | EVALUATION OF EACH EVALUATION AREA IN AREA EXTRACTION RANGE | AREA EXTRACTION RANGE RESETTING DIRECTION | AREA EXTRACTION RANGE RESETTING EXAMPLE |
|---|---|---|---|
| 1 | H H H / L L L / L L L | UPWARD DIRECTION | 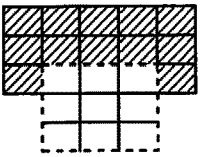 |
| 2 | L L L / L L L / H H H | DOWNWARD DIRECTION | 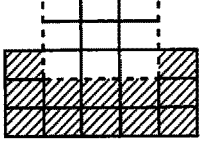 |
| 3 | H L L / H L L / H L L | LEFTWARD DIRECTION | 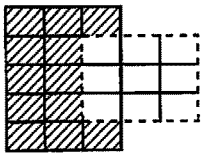 |
| 4 | L L H / L L H / L L H | RIGHTWARD DIRECTION | 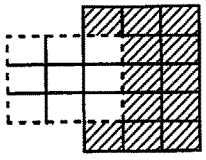 |
| 5 | H H H / H L L / H L L | LEFT-UPWARD DIRECTION | 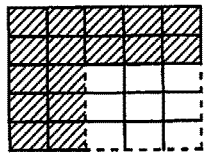 |
| 6 | H H H / L L H / L L H | RIGHT-UPWARD DIRECTION | 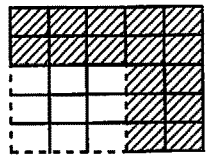 |
| 7 | H L L / H L L / H H H | LEFT-DOWNWARD DIRECTION | 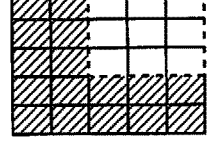 |
| 8 | L L H / L L H / H H H | RIGHT-DOWNWARD DIRECTION | 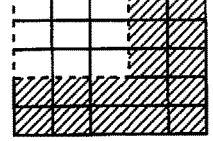 |
| 9 | OTHERS | PERIPHERY | 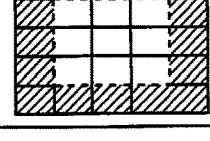 |

IMAGE PROCESSING APPARATUS, NON-TRANSITORY COMPUTER-READABLE RECORDING MEDIUM STORING COMPUTER PROGRAM, AND IMAGE PROCESSING METHOD

CROSS REFERENCE TO RELATED APPLICATION

This application claims benefit of Japanese Application No. 2018-103388 filed in Japan on May 30, 2018, the entire contents of which are incorporated herein by this reference.

BACKGROUND OF THE INVENTION

1. Field of the Invention

The present invention relates to an image processing apparatus that synthesizes a plurality of images to generate a high-resolution composite image, a non-transitory computer-readable recording medium storing a computer program, and an image processing method.

2. Description of the Related Art

Conventionally, a technique for enabling an in-focus portion in an image to be confirmed has been proposed.

For example, Japanese Patent Application Laid-Open Publication No. 2004-242010 describes an image pickup apparatus that makes it possible to easily confirm which position in an image is in focus by partitioning an AF (autofocus) area in the image into sub-blocks, calculating an evaluation value representing a degree of focusing of each of the sub-blocks, and displaying the sub-block in which the evaluation value is high.

A technique for synthesizing a plurality of images consecutively photographed to generate a composite image having a higher resolution than respective resolutions of the images acquired by the photographing, that is, a technique for generating a pixel shifting super-resolution image has been proposed.

SUMMARY OF THE INVENTION

According to an aspect of the present invention, there is provided an image processing apparatus that synthesizes a plurality of images consecutively photographed to generate a composite image having a higher resolution than respective resolutions of the plurality of images, the image processing apparatus including a pixel shifting super-resolution image generation circuit configured to align and arrange, for each of the plurality of images, a plurality of pixels constituting the image in a high-resolution image space for configuring the composite image, to generate the composite image, an evaluation area setting circuit configured to set, for the composite image, an area extraction range while setting a plurality of evaluation areas within the area extraction range, a synthesis accuracy evaluation circuit configured to evaluate, for each of the plurality of evaluation areas, a pixel filling rate for the evaluation area and calculate a plurality of pixel filling rate evaluation values, and a determination circuit configured to determine a determination area from among the plurality of evaluation areas based on the plurality of pixel filling rate evaluation values.

According to another aspect of the present invention, there is provided a non-transitory computer-readable recording medium storing a computer program, in which the computer program is a program for causing a computer to perform image processing for synthesizing a plurality of images consecutively photographed to generate a composite image having a higher resolution than respective resolutions of the plurality of images, and the computer is caused to perform aligning and arranging, for each of the plurality of images, a plurality of pixels constituting the image in a high-resolution image space for configuring the composite image, to generate the composite image, setting, for the composite image, an area extraction range while setting a plurality of evaluation areas within the area extraction range, evaluating, for each of the plurality of evaluation areas, a pixel filling rate for the evaluation area and calculating a plurality of pixel filling rate evaluation values, and determining a determination area from among the plurality of evaluation areas based on the plurality of pixel filling rate evaluation values.

According to still another aspect of the present invention, there is provided an image processing method for synthesizing a plurality of images consecutively photographed to generate a composite image having a higher resolution than respective resolutions of the plurality of images, the image processing method including aligning and arranging, for each of the plurality of images, a plurality of pixels constituting the image in a high-resolution image space for configuring the composite image, to generate the composite image, setting, for the composite image, an area extraction range while setting a plurality of evaluation areas within the area extraction range, evaluating, for each of the plurality of evaluation areas, a pixel filling rate for the evaluation area and calculating a plurality of pixel filling rate evaluation values, and determining a determination area from among the plurality of evaluation areas based on the plurality of pixel filling rate evaluation values.

BRIEF DESCRIPTION OF THE DRAWINGS

FIG. 14 is a chart illustrating an example in which an area extraction range is reset according to evaluation of evaluation areas in the first embodiment;

DETAILED DESCRIPTION OF THE PREFERRED EMBODIMENTS

Embodiments of the present invention will be described below with reference to the drawings.

First Embodiment

Figure 1:
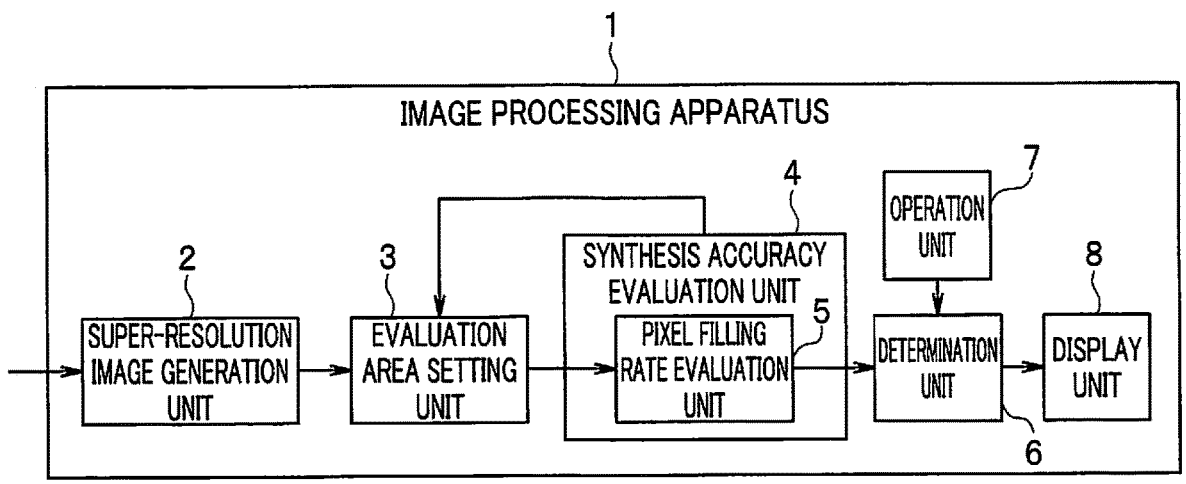
FIG. 1 is a block diagram illustrating a configuration of an image processing apparatus according to a first embodiment of the present invention.

FIGS. 1 to 14 illustrate a first embodiment of the present invention, where FIG. 1 is a block diagram illustrating a configuration of an image processing apparatus 1.

The image processing apparatus 1 synthesizes a plurality of images consecutively photographed, to generate a composite image having a higher resolution than respective resolutions of the photographed plurality of images.

The image processing apparatus 1 includes a pixel shifting super-resolution image generation unit 2 (hereinafter simply referred to as a super-resolution image generation unit 2 in the drawings and in the following) as a pixel shifting super-resolution image generation circuit, an evaluation area setting unit 3 as an evaluation area setting circuit, a synthesis accuracy evaluation unit 4 as a synthesis accuracy evaluation circuit, a determination unit 6 as a determination circuit, an operation unit 7, and a display unit 8 as a display.

The super-resolution image generation unit 2 aligns and arranges, for each of the plurality of images, a plurality of pixels constituting the image in a high-resolution image space for configuring a composite image (an image space having a higher resolution than a resolution of the photographed image), to generate a composite image.

The evaluation area setting unit 3 sets, for the composite image, an area extraction range as an evaluation area setting range while setting a plurality of evaluation areas within the area extraction range.

The synthesis accuracy evaluation unit 4 includes a pixel filling rate evaluation unit 5 configured to calculate a pixel filling rate evaluation value. The synthesis accuracy evaluation unit 4 evaluates, for each of the plurality of evaluation areas, a pixel filling rate for the evaluation area (the pixel filling rate will be described below with reference to FIG. 7) and calculates a plurality of pixel filling rate evaluation values.

The pixel filling rate evaluation value is an evaluation value which increases as the pixel filling rate increases. As the pixel filling rate evaluation value, the pixel filling rate may be used as it is, or another evaluation value at which a magnitude relationship among values of the pixel filling rate holds as it is in a magnitude relationship among values of the pixel filling rate evaluation value may be found based on the pixel filling rate. For example, a value obtained by multiplying the pixel filling rate by a constant may be set as the pixel filling rate evaluation value, or a value of a monotonically increasing function using the pixel filling rate as a variable may be set as the pixel filling rate evaluation value.

Further, the synthesis accuracy evaluation unit 4 judges whether or not the maximum pixel filling rate evaluation value among the plurality of pixel filling rate evaluation values is a value within a first predetermined range, and causes the evaluation area setting unit 3 to reset the area extraction range and the plurality of evaluation areas when the maximum pixel filling rate evaluation value is not a value within the first predetermined range.

The synthesis accuracy evaluation unit 4 processes the reset plurality of evaluation areas again.

The determination unit 6 determines a determination area from among the plurality of evaluation areas based on the plurality of pixel filling rate evaluation values, respectively, for the plurality of evaluation areas. For example, the determination unit 6 determines, when the synthesis accuracy evaluation unit 4 judges that the maximum pixel filling rate evaluation value is a value within the first predetermined range, the evaluation area having the maximum pixel filling rate evaluation value as a determination area.

The operation unit 7 is used for performing an operation input for the image processing apparatus 1. For example, a parameter for the determination unit 6 to determine a determination area based on the plurality of pixel filling rate evaluation values is inputted from the operation unit 7.

In one example, the parameter for the evaluation area to be determined as a determination area is set as a maximum pixel filling rate evaluation value when the operation unit 7 does not perform a specific operation (e.g., an operation for pressing a specific button), is set as a second largest pixel filling rate evaluation value when the operation unit 7 performs the specific operation once, and is set as a third largest pixel filling rate evaluation value when the operation unit 7 performs the specific operation two times.

The display unit 8 displays a determination area determined by the determination unit 6.

Processing for generating a pixel shifting super-resolution image by the super-resolution image generation unit 2 will be described below with reference to FIGS. 2 to 7. Note that in high-resolution image spaces respectively illustrated in FIGS. 2 to 7, pixel data is arranged at a hatched pixel, and no pixel data is arranged at a pixel not hatched.

Figure 2:
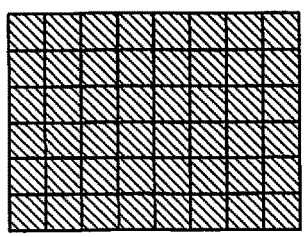
FIG. 2 is a diagram illustrating an example of a configuration of pixels constituting one image obtained by photographing in the first embodiment.

FIG. 2 is a diagram illustrating an example of a pixel configuration of one image obtained by photographing.

Figure 3:
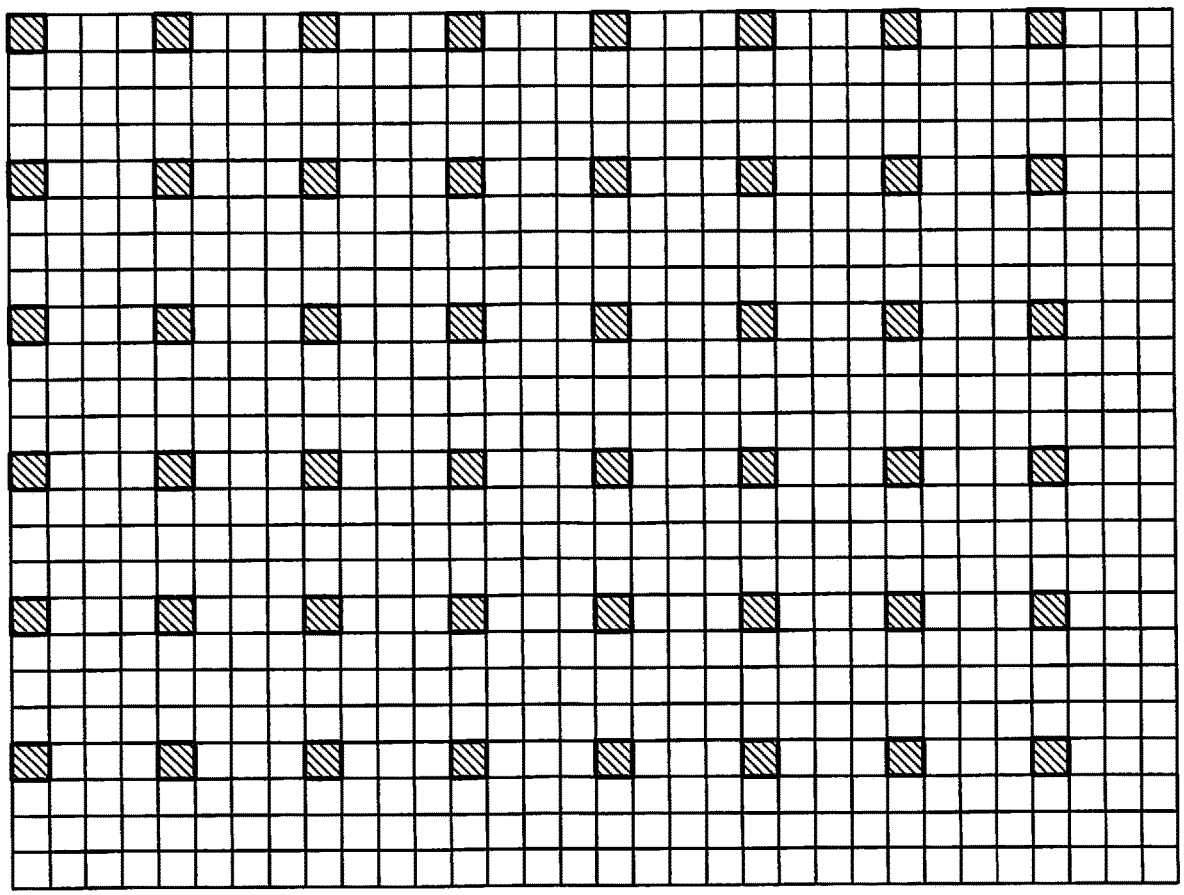
FIG. 3 is a diagram illustrating how pixel data constituting a first image obtained by photographing are aligned and arranged in a high-resolution image space in the first embodiment.

FIG. 3 is a diagram illustrating how pixel data constituting the first image obtained by photographing are aligned and arranged in the high-resolution image space.

The high-resolution image space is a space for configuring a composite image. For example, the image spaces respectively illustrated in FIGS. 3 to 7 are each a space having a resolution which is four times in length by four times in width a resolution of the image space (see FIG. 2) of the one image obtained by photographing.

The pixel data of each of the pixels constituting the one image obtained by photographing are aligned and arranged in the high-resolution image space.

For each of a plurality of images as a source for generating the pixel shifting super-resolution image, a shift in position between an optical image formed by a photographing optical system and an image pickup device configured to photoelectrically convert and acquire the image needs to occur. At this time, the shift in position may occur by moving the image pickup device using an image stabilization mechanism, for example, or the shift in position may occur due to a camera-shake by a user who holds an image pickup apparatus.

If the image pickup device is moved to a predetermined pixel shifting position using the image stabilization mechanism with the image pickup apparatus such as a camera fixed or if the image pickup device is further moved to the predetermined pixel shifting position after the image stabilization mechanism has stabilized the camera-shake even when the image pickup apparatus is hand-held, for example, an image at a target pixel shifting position can be acquired. Therefore, respective shifts in position of the second and subsequent images with respect to the first image are known.

On the other hand, if a camera-shake exceeding a stabilization range by the image stabilization mechanism has occurred or if handheld photographing is performed without using the image stabilization mechanism, for example, the images need to be aligned in an appropriate pixel shifting position after the respective shifts in position of the second and subsequent images with respect to the first image are detected.

In such a case, respective motion vectors for the second and subsequent images with respect to the first image can be calculated using a known technique such as block matching. At this time, edges, for example, at which the same shape is easily confirmed, in different images are respectively set as reference points. Motion vectors are calculated for a plurality of reference points within each of the images, and motion vectors for all pixels within the image are calculated by further performing interpolation. Such processing is performed for each of the second and subsequent images using the first image as a reference.

If the image pickup apparatus is fixed, the calculated motion vector for each of the pixels becomes a vector representing movement of an object.

On the other hand, if the image pickup apparatus is not fixed, translation and rotation of the entire image may occur due to the camera-shake or the like. In this case, a projective transformation matrix, for example, is found based on the respective motion vectors for the plurality of reference points. The projective transformation matrix is a matrix in which when a "point" in each of the second and subsequent images is converted by the projective transformation matrix, a point corresponding to the "point" in the first image is found. If projective transformation matrices respectively found for the second and subsequent images are used, the second and subsequent images can be aligned with the first image. The motion vector remaining after respective effects of the translation and the rotation of the entire image are removed by the projective transformation matrix becomes the vector representing the movement of the object.

Figure 4:
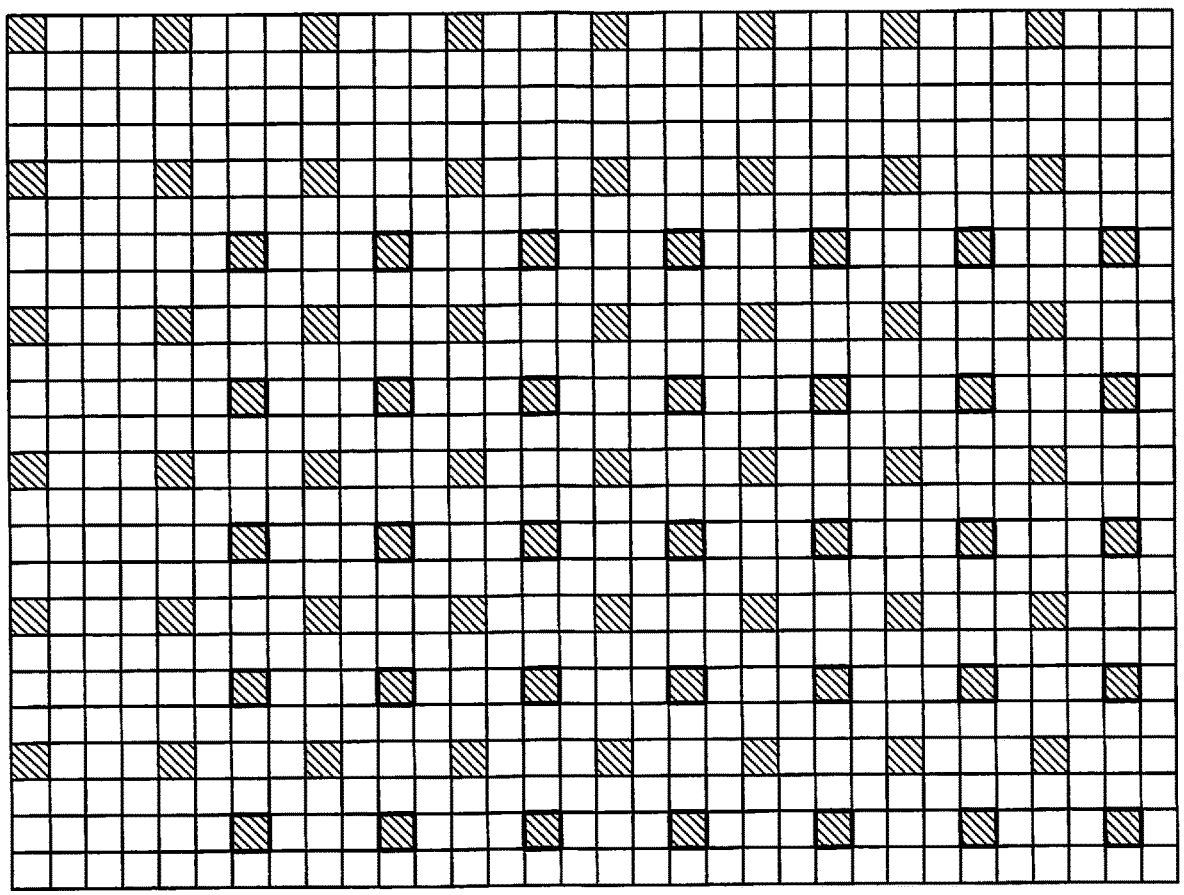
FIG. 4 is a diagram illustrating how pixel data constituting a second image obtained by photographing are aligned and arranged in the high-resolution image space in the first embodiment.

FIG. 4 is a diagram illustrating how pixel data constituting the second image obtained by photographing are aligned and arranged in the high-resolution image space. The pixel data constituting the second image newly arranged in the high-resolution image space are respectively indicated by thick frames.

In an illustrated example, the second image is in a state where the image pickup device (or the entire image pickup apparatus) has moved downward to the right with respect to the first image. Among pixels constituting the second image, pixel data of the pixel sticking out of the high-resolution image space is not arranged in the high-resolution image space.

Figure 5:
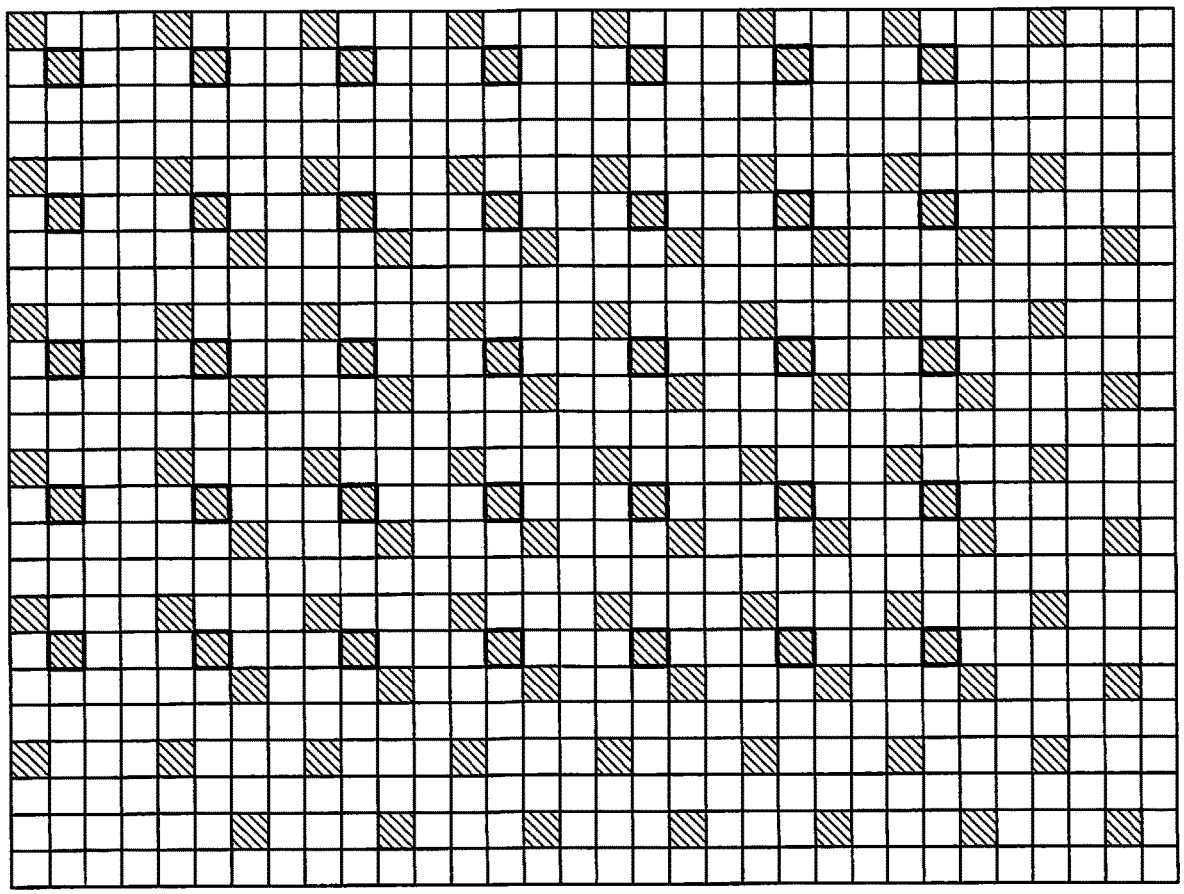
FIG. 5 is a diagram illustrating how pixel data constituting a third image obtained by photographing are aligned and arranged in the high-resolution image space in the first embodiment.

FIG. 5 is a diagram illustrating how pixel data constituting the third image obtained by photographing are aligned and arranged in the high-resolution image space. The pixel data constituting the third image newly arranged in the high-resolution image space are respectively indicated by thick frames.

In an illustrated example, the third image is in a state where the image pickup device (or the entire image pickup apparatus) has moved upward to the left with respect to the first image. Among pixels constituting the third image, pixel data of the pixel sticking out of the high-resolution image space is not arranged in the high-resolution image space.

Thus, the super-resolution image generation unit 2 generates a high-resolution image by arranging pixels constituting a plurality of images (e.g., at least 16 images when the high-resolution image space has a resolution which is four times in length by four times in width a resolution of the above-described photographed image) which shift in position in the high-resolution image space while aligning the pixels.

Figure 6:
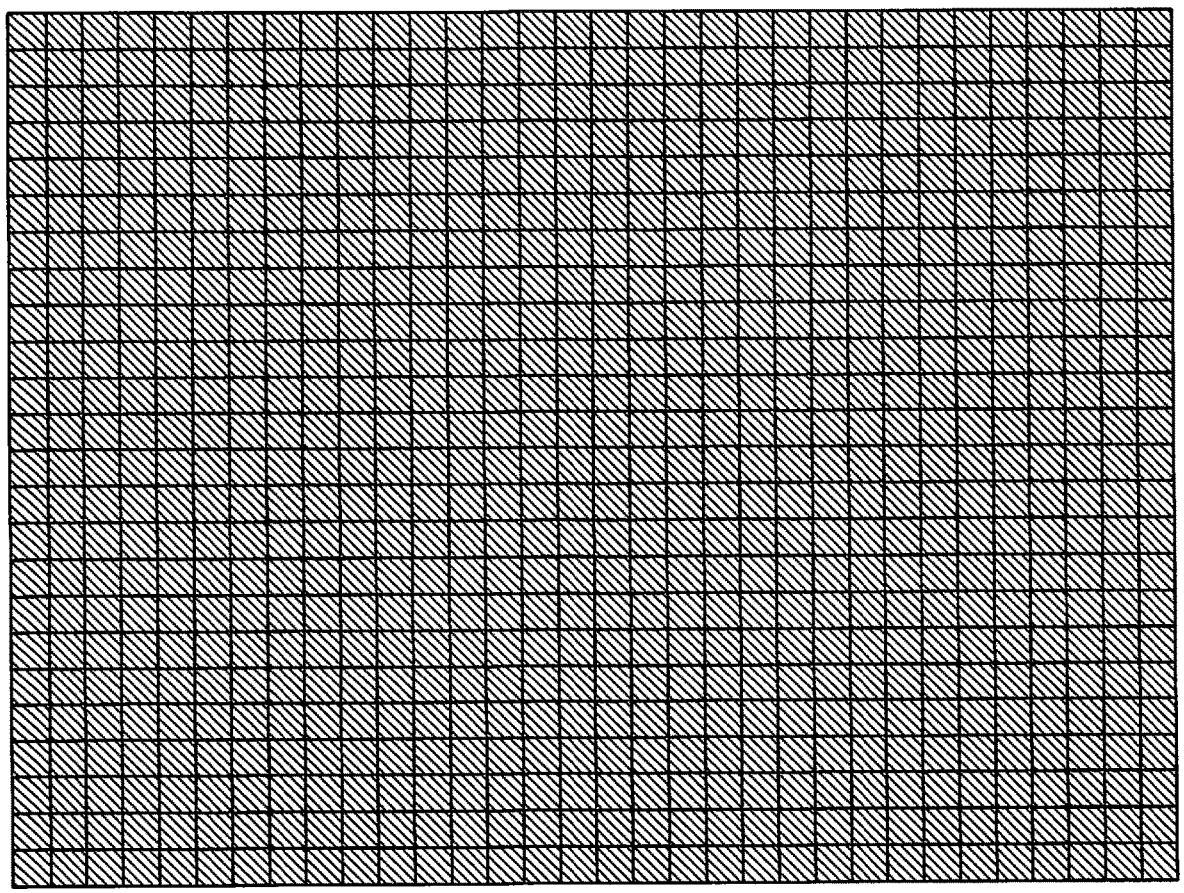
FIG. 6 is a diagram illustrating an ideal state occurring when pixel data constituting a plurality of images obtained by photographing have been aligned and arranged in the high-resolution image space in the first embodiment.

FIG. 6 is a diagram illustrating an ideal state occurring when pixel data constituting the plurality of images obtained by photographing have been aligned and arranged in the high-resolution image space.

A high-resolution image generated by the alignment is ideally embedded without the pixel data missing at all pixel positions of the high-resolution image space, as illustrated in FIG. 6. However, if an object which moves exists within the plurality of images obtained by photographing, for example, pixels not suitable for generating the high-resolution image by synthesis may appear. In this case, the pixels not suitable for the synthesis are not arranged within the high-resolution image space.

Figure 7:
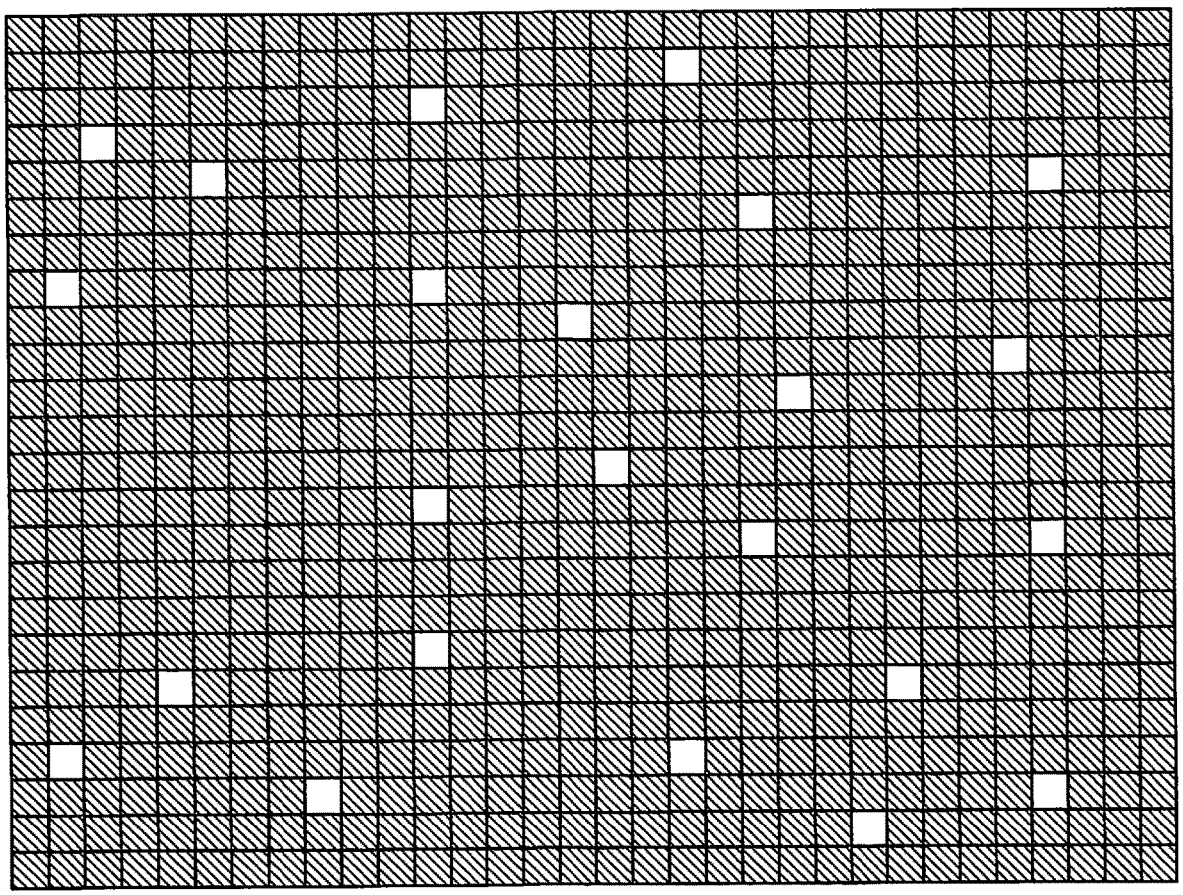
FIG. 7 is a diagram illustrating an example in which there exist pixels where no pixel data is arranged when pixel data constituting the plurality of images obtained by photographing have been aligned and arranged in the high-resolution image space in the first embodiment.

FIG. 7 is a diagram illustrating an example in which the pixels where no pixel data is arranged exist when the pixel data constituting the plurality of images obtained by photographing have been aligned and arranged in the high-resolution image space.

Accordingly, even if the plurality of images obtained by photographing have been arranged in the high-resolution image space, the pixel positions which have not been filled with the pixel data may occur, as illustrated in FIG. 7. In such a case, the super-resolution image generation unit 2 performs processing for interpolating the pixel data of the pixel at the pixel position which has not been filled with the pixel data based on the pixel data of the pixels around the pixel (the pixels around and having the same color as the pixel in a case of a color image) to fill the pixel position with the pixel data (missing pixel interpolation).

In such processing, in the high-resolution image space after the pixel data have been arranged and before the missing pixel interpolation is performed, a ratio of a number of pixel positions which have been filled with the pixel data to a number of all pixel positions within any area is referred to as a pixel filling rate in the area. It can be said that the higher the pixel filling rate is, the higher synthesis accuracy of a composite image is, and thus the higher a pixel shifting super-resolution effect is. The above-described pixel filling rate evaluation unit 5 processes a composite image after the pixel data have been arranged and before the missing pixel interpolation is performed.

Figure 8:
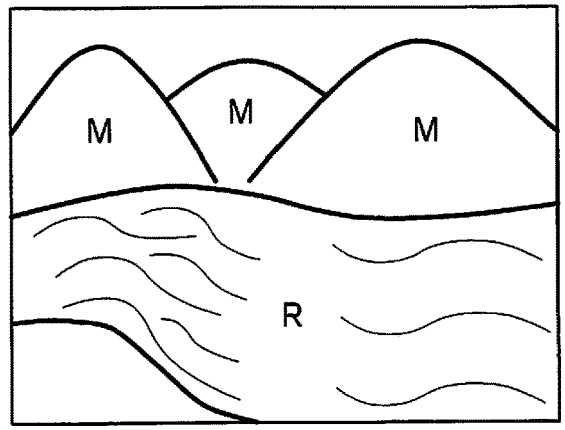
FIG. 8 is a diagram illustrating an example in which there exists an object which moves within a photographing range in the first embodiment.
Figure 9:
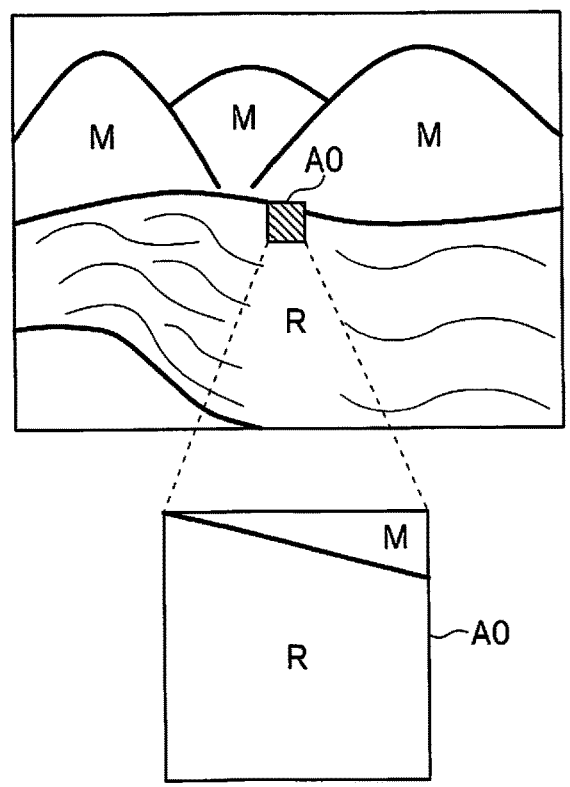
FIG. 9 is a diagram illustrating an example of an object existing within an AF area when the AF area is set at a center of the photographing range in the first embodiment.
Figure 10:
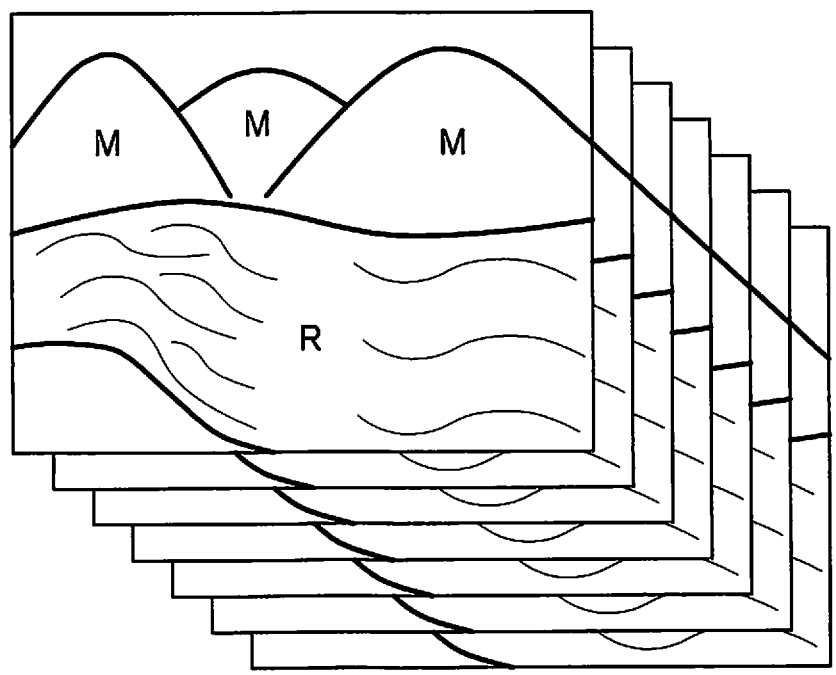
FIG. 10 is a diagram illustrating an example of a plurality of images consecutively photographed to generate a composite image in the first embodiment.
Figure 11:
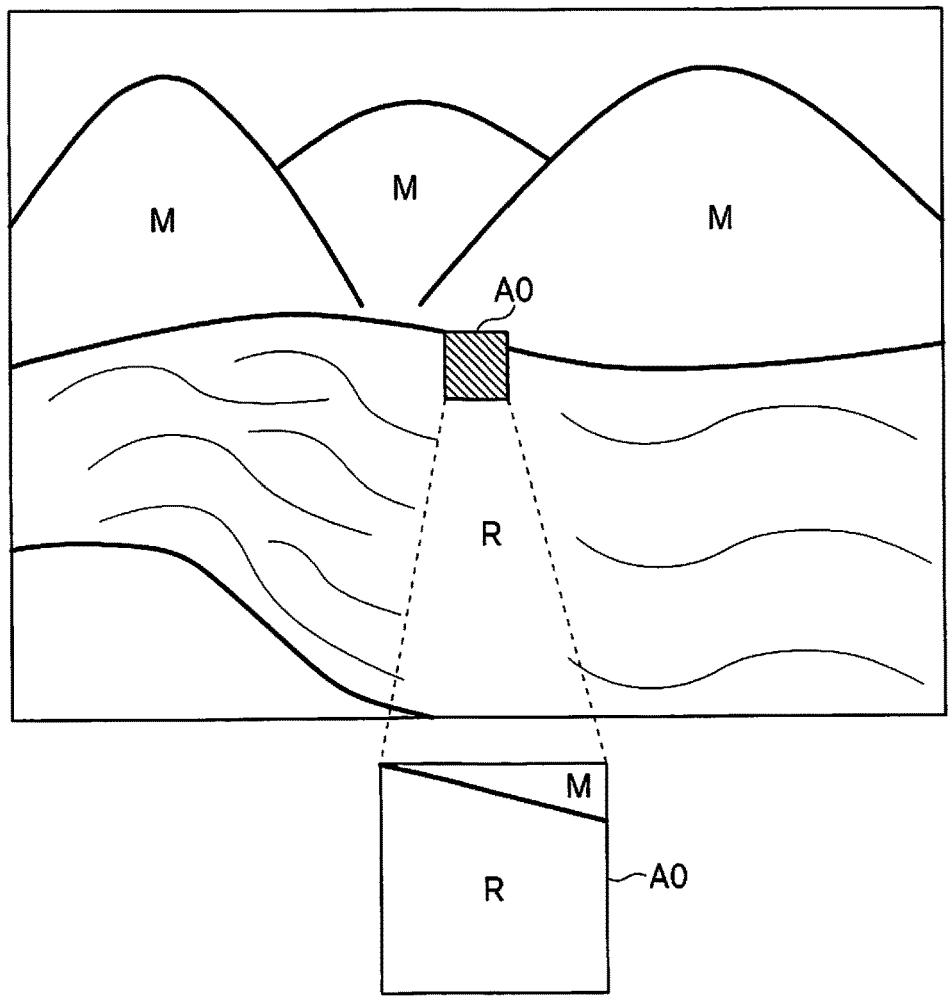
FIG. 11 is a diagram illustrating an example of an AF area in the composite image and an object existing within the AF area in the first embodiment.

FIG. 8 is a diagram illustrating an example in which an object which moves exists within a photographing range, FIG. 9 is a diagram illustrating an example of the object existing within an AF area AO when the AF area AO is set at a center of the photographing range, FIG. 10 is a diagram illustrating an example of a plurality of images consecutively photographed to generate a composite image, and FIG. 11 is a diagram illustrating an example of the AF area AO in the composite image and the object existing within the AF area AO.

As illustrated in FIG. 8, in a photographing scene having a plurality of mountains M in its distant place and a river R in its central portion, for example, an AF (autofocus) area is set at a center of an image, as illustrated in a hatched portion in FIG. 9. In this case, if AF processing is performed for the river R including a part of the mountains M within the AF area AO, one image focused in the AF area AO can be photographed.

When a plurality of such photographing scenes are photographed, as illustrated in FIG. 10, each of images is focused in the AF area AO. However, the river R is flowing and is a moving object. Accordingly, respective states of the rivers R in the images differ from one another. Therefore, even if the plurality of images are synthesized to generate a composite image as illustrated in FIG. 11, an image portion of the river R does not have a high resolution, i.e., the AF area AO a large part of which becomes the image portion of the river R also becomes an area where synthesis accuracy cannot be appropriately confirmed.

Figure 13:
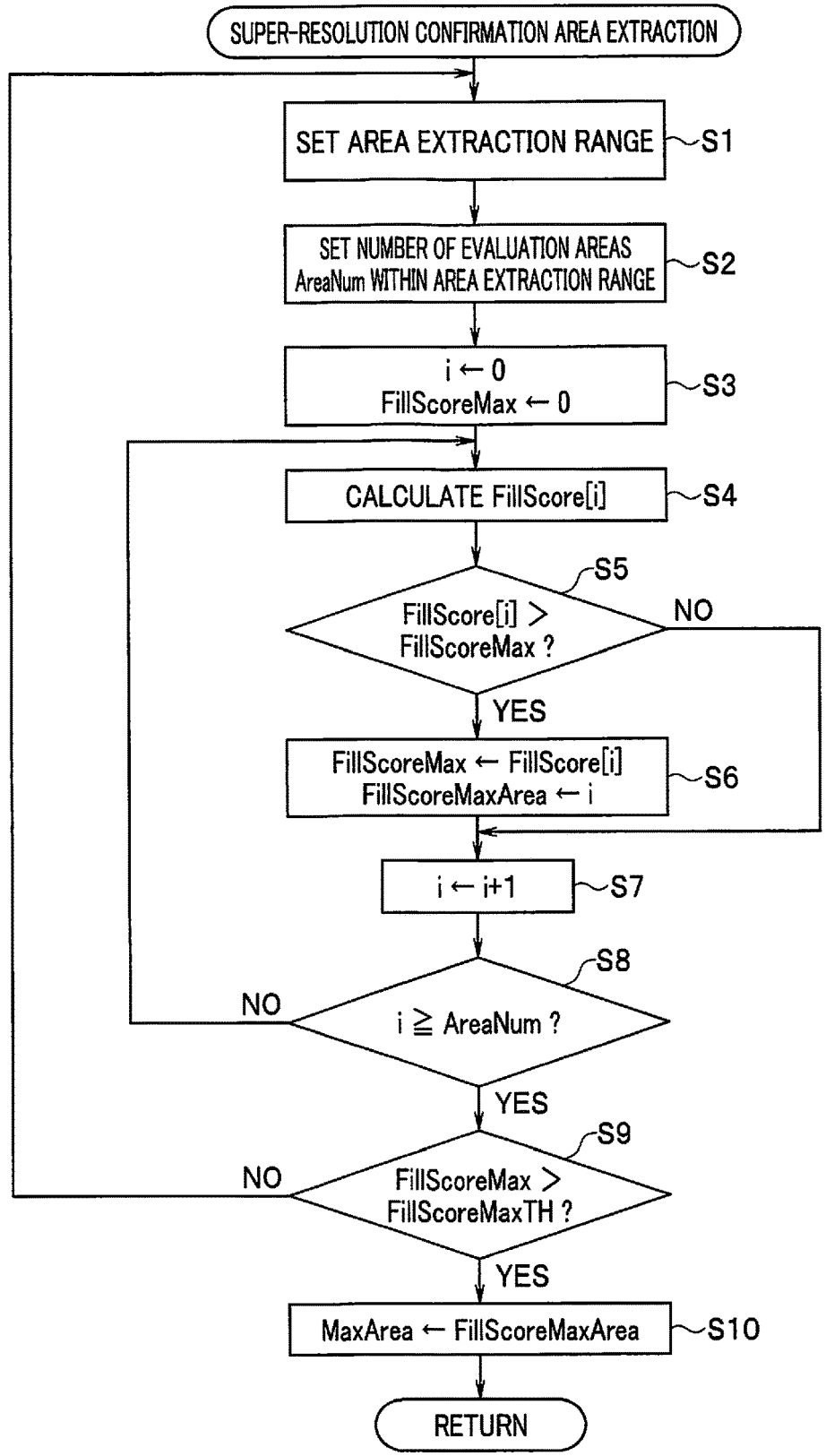
FIG. 13 is a flowchart illustrating super-resolution confirmation area extraction processing in the first embodiment.

The image processing apparatus 1 performs processing as illustrated in FIG. 13, to determine an area where a pixel shifting super-resolution image effect is easily confirmed as a determination area. FIG. 13 is a flowchart illustrating super-resolution confirmation area extraction processing.

When main processing (not illustrated) proceeds to the processing, the evaluation area setting unit 3 sets an area extraction range in a composite image while setting a plurality of evaluation areas within the area extraction range (step S1).

The plurality of evaluation areas may be set by dividing the area extraction range. In this case, the plurality of evaluation areas match the area extraction range when all added up. Alternatively, the plurality of evaluation areas may be set with appropriate spacing within the area extraction range. In this case, an area not included in the evaluation areas may occur within the area extraction range.

The plurality of evaluation areas preferably respectively become areas of the same size (i.e., areas which are the same in "a number of pixels in a longitudinal direction by a number of pixels in a lateral direction") (to enable evaluation values, as described below, to be properly compared with one another). However, the respective sizes of the plurality of evaluation areas are not prevented from differing from one another.

Figure 12:
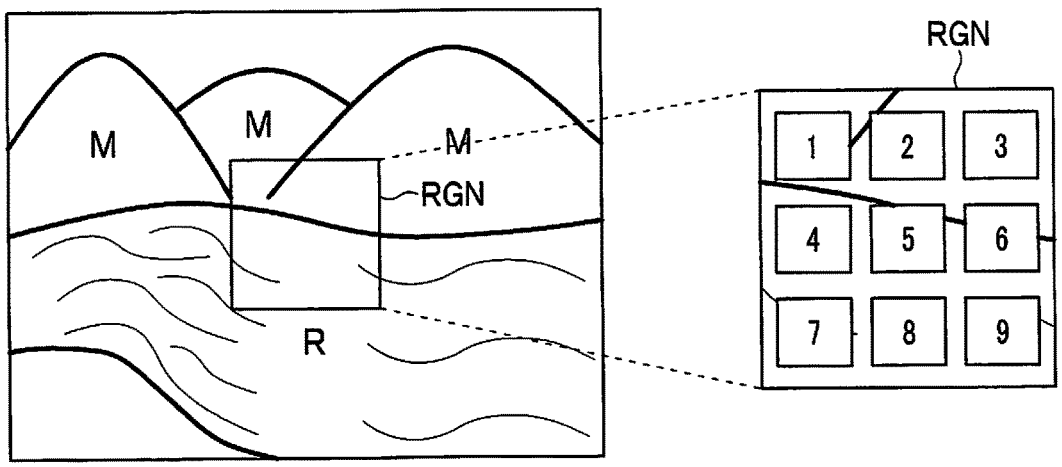
FIG. 12 is a diagram illustrating an example in which an area extraction range is set in a composite image and a plurality of evaluation areas are set within the area extraction range in the first embodiment.

If a process in step S1 is first performed after the processing illustrated in FIG. 13 is started, the evaluation area setting unit 3 sets an area extraction range RGN to include an AF area and an area around the AF area, as illustrated in FIG. 12, for example.

FIG. 12 is a diagram illustrating an example in which the area extraction range RGN is set in a composite image and a plurality of evaluation areas are set within the area extraction range RGN.

In the example illustrated in FIG. 12, 3×3=9 evaluation areas are set within the area extraction range RGN, and the fifth evaluation area in a central portion of an image, for example, is an AF area. The first to fourth and sixth to ninth evaluation areas are further set around the fifth evaluation area.

The evaluation area setting unit 3 sets a number of evaluation areas (nine in the example illustrated in FIG. 12) set within the area extraction range RGN as a number of evaluation areas AreaNum (step S2).

Then, the synthesis accuracy evaluation unit 4 initializes a parameter. Zero is set as an area number i for counting the number of evaluation areas, and zero is set as FillScoreMax representing a maximum value of respective pixel filling rate evaluation values for the plurality of evaluation areas set within the area extraction range (step S3).

Then, the pixel filling rate evaluation unit 5 calculates a pixel filling rate evaluation value FillScore[i] for the evaluation area assigned the area number i (step S4). Although the pixel filling rate evaluation value FillScore[i] may be calculated using various methods, as described above, a pixel filling rate is used as it is, for example. In this case, the pixel filling rate evaluation value FillScore[i] is calculated, as expressed by the following equation 1, as a ratio of a number of pixels AreaPixDataNum at which pixel data are arranged in the evaluation area assigned the area number i to a number of all pixels AreaPixNum in the evaluation area assigned the area number i.

$$FillScore[i]=AreaPixDataNum/AreaPixNum \quad \text{[Equation 1]}$$

Therefore, the pixel filling rate evaluation value FillScore[i] using the pixel filling rate as it becomes a value which takes a value of not less than 0 nor more than 1 and is normalized. If the pixel filling rate evaluation value FillScore[i] is calculated using another method, normalization processing may be separately performed.

Further, the synthesis accuracy evaluation unit 4 judges whether or not the calculated pixel filling rate evaluation value FillScore[i] is more than a value currently set as FillScoreMax representing the maximum value of the pixel filling rate evaluation values (step S5).

If it is judged in step S5 that FillScore[i] is more than FillScoreMax, the synthesis accuracy evaluation unit 4 sets the pixel filling rate evaluation value FillScore[i] calculated in step S4 as FillScoreMax while setting a value of the area number i as an area number FillScoreMaxArea in which the pixel filling rate evaluation value reaches a maximum (step S6).

If a process in step S6 is performed or if it is judged in step S5 that FillScore[i] is not more than FillScoreMax, the synthesis accuracy evaluation unit 4 increases the value of the area number i by one (step S7).

The synthesis accuracy evaluation unit 4 judges whether or not the area number i has reached the number of evaluation areas AreaNum (step S8).

If it is judged in step S8 that the area number i has not reached the number of evaluation areas AreaNum, the processing returns to step S4, described above. In step S4, the above-described processing is performed for the subsequent evaluation area.

If it is judged in step S8 that the area number i has reached the number of evaluation areas AreaNum, the synthesis accuracy evaluation unit 4 judges whether or not the maximum value FillScoreMax of the pixel filling rate evaluation values is more than a predetermined focusing confirmation area judgment threshold value FillScoreMaxTH (step S9). The focusing confirmation area judgment threshold value FillScoreMaxTH is a threshold value used for judgment not to set the evaluation area for which the pixel filling rate evaluation value is FillScoreMaxTH or less as a determination area.

If it is judged in step S9 that FillScoreMax is not more than FillScoreMaxTH, the processing returns to step S1, described above. In step S1, the evaluation area setting unit 3 resets the area extraction range and the evaluation areas, and then the above-described processing is performed.

On the other hand, if it is judged in step S9 that FillScoreMax is more than FillScoreMaxTH, the determination unit 6 sets a value of the area number FillScoreMaxArea in which the pixel filling rate evaluation value reaches a maximum as a maximum evaluation value area number MaxArea, and determines the evaluation area indicated by the maximum evaluation value area number MaxArea as a determination area (step S10), and the processing returns to the main processing (not illustrated).

As a result, the determination area determined by the determination unit 6 is displayed on the display unit 8. More specifically, display for clearly indicating which portion in an image corresponds to the determination area is performed, and the determination area is further displayed in an enlarged manner, if necessary, so that synthesis accuracy confirmation (confirmation whether or not a higher resolution has been appropriately achieved in a composite image) and focusing confirmation, for example, can be performed. It is needless to say that a composite image, which has been subjected to the above-described missing pixel interpolation by the super-resolution image generation unit 2, is displayed at this time.

FIG. 14 is a chart illustrating an example in which an area extraction range is reset depending on evaluation of evaluation areas.

When it is judged in step S9, described above, that the maximum value FillScoreMax of the pixel filling rate evaluation values is not more than the predetermined focusing confirmation area judgment threshold value FillScoreMaxTH, and the processing returns to step S1, to reset the area extraction range and the evaluation areas, the evaluation area setting unit 3 performs the resetting using a method as illustrated in FIG. 14, for example.

In an evaluation column of each of the evaluation areas in the area extraction range illustrated in FIG. 14, an evaluation area for which an evaluation value (a pixel filling rate evaluation value in the above-described example) is a predetermined threshold value (in one example, an average value of evaluation values for all the evaluation areas within the area extraction range) or more is designated by "H", and the evaluation area for which the evaluation value is less than the predetermined threshold value is designated by "L".

When the first to third evaluation areas and the fourth to ninth evaluation areas are respectively designated by H and L among the first to ninth evaluation areas as illustrated in FIG. 12, as illustrated in a first column, an area extraction range and evaluation areas as indicated by a hatched portion in an area extraction range resetting example are set using an area extraction range resetting direction as an upward direction.

When the first to sixth evaluation areas and the seventh to ninth evaluation areas are respectively designated by L and H, as illustrated in a second column, an area extraction range and evaluation areas as indicated by a hatched portion in the area extraction range resetting example are set using the area extraction range resetting direction as a downward direction.

When the first, fourth, and seventh evaluation areas and the other evaluation areas are respectively designated by H and L, as illustrated in a third column, an area extraction range and evaluation areas as indicated by a hatched portion in the area extraction range resetting example are set using the area extraction range resetting direction as a leftward direction.

When the third, sixth, and ninth evaluation areas and the other evaluation areas are respectively designated by H and L, as illustrated in a fourth column, an area extraction range and evaluation areas as indicated by a hatched portion in the area extraction range resetting example are set using the area extraction range resetting direction as a rightward direction.

When the first to third, fourth, and seventh evaluation areas and the other evaluation areas are respectively designated by H and L, as illustrated in a fifth column, an area extraction range and evaluation areas as indicated by a hatched portion in the area extraction range resetting example are set using the area extraction range resetting direction as a left-upward direction.

When the first to third, sixth, and ninth evaluation areas and the other evaluation areas are respectively designated by H and L, as illustrated in a sixth column, an area extraction range and evaluation areas as indicated by a hatched portion in the area extraction range resetting example are set using the area extraction range resetting direction as a right-upward direction.

When the first, fourth, and seventh to ninth evaluation areas and the other evaluation areas are respectively designated by H and L, as illustrated in a seventh column, an area extraction range and evaluation areas as indicated by a hatched portion in the area extraction range resetting example are set using the area extraction range resetting direction as a left-downward direction.

When the third, sixth, and seventh to ninth evaluation areas and the other evaluation areas are respectively designated by H and L, as illustrated in an eighth column, an area extraction range and evaluation areas as indicated by a hatched portion in the area extraction range resetting example are set using the area extraction range resetting direction as a right-downward direction.

When an arrangement of H and L designating the evaluation areas is other than the above-described arrangements, as illustrated in a ninth column, an area extraction range and evaluation areas as indicated by a hatched portion in the area extraction range resetting example are set around the current area extraction range.

Note that FIG. 14 illustrates an example of a case where the 3×3=9 evaluation areas are set within the area extraction range, the area extraction range and the evaluation areas may be reset in a similar method even when the number and the arrangement of the evaluation areas to be set are made respectively different.

Although an example in which the area extraction range is reset toward the evaluation areas for which the evaluation value is high is illustrated, the area extraction range and the evaluation areas as illustrated in the ninth column may be reset without any case classification.

Note that in processes in steps S5, S6, and S10, described above, if the plurality of evaluation areas for which the pixel filling rate evaluation value reaches a maximum value exist, the value of the area number i assigned to the evaluation area first found is set as the maximum evaluation value area number MaxArea, to determine a determination area. However, it is needless to say that the present invention is not limited to this.

That is, if the plurality of evaluation areas for which the pixel filling rate evaluation value reaches a maximum value exist, the determination unit 6 may select any one of the evaluation areas as a determination area. Although any method can be used as a selection method at this time, a method for selecting the evaluation area closest to the center of the image (or closest to the AF area) is taken as an example. Alternatively, all the one or more evaluation areas for which the pixel filling rate evaluation value reaches a maximum value may be respectively determined as determination areas.

Although the determination unit 6 sets the evaluation area for which the pixel filling rate evaluation value reaches a maximum value as a determination area in the foregoing, the present invention is not limited to this. A determination area may be determined depending on an operation input from the operation unit 7. For example, the determination unit 6 sets the evaluation area for which the pixel filling rate evaluation value reaches a maximum value as a determination area when a specific user operation has not been performed, sets the evaluation area for which the pixel filling rate evaluation value reaches a second largest value as a determination area when the specific user operation has been performed once, sets the evaluation area for which the pixel filling rate evaluation value reaches a third largest value as a determination area when the specific user operation has been performed two times.

According to the first embodiment, a determination area is determined based on the respective pixel filling rate evaluation values for the plurality of evaluation areas set in the area extraction range. Accordingly, even if synthesis accuracy cannot be confirmed in the AF area, the synthesis accuracy of the composite image can be appropriately confirmed based on a determination area having the high pixel filling rate evaluation value.

When the maximum pixel filling rate evaluation value is not a value within the first predetermined range (more specifically, a range which is more than the predetermined focusing confirmation area judgment threshold value FillScoreMaxTH in step S9), the area extraction range and the plurality of evaluation areas are reset. Accordingly, an area for which the pixel filling rate evaluation value is higher can be selected as a determination area.

Further, the evaluation area having the maximum pixel filling rate evaluation value which is judged as a value in the first predetermined range is determined as a determination area. Accordingly, the synthesis accuracy can be always confirmed in a determination area where synthesis has been appropriately performed.

The display unit 8 configured to display a determination area is further provided. Accordingly, the synthesis accuracy can be visually confirmed by the determination area displayed on the display unit 8.

Second Embodiment

Figure 15:
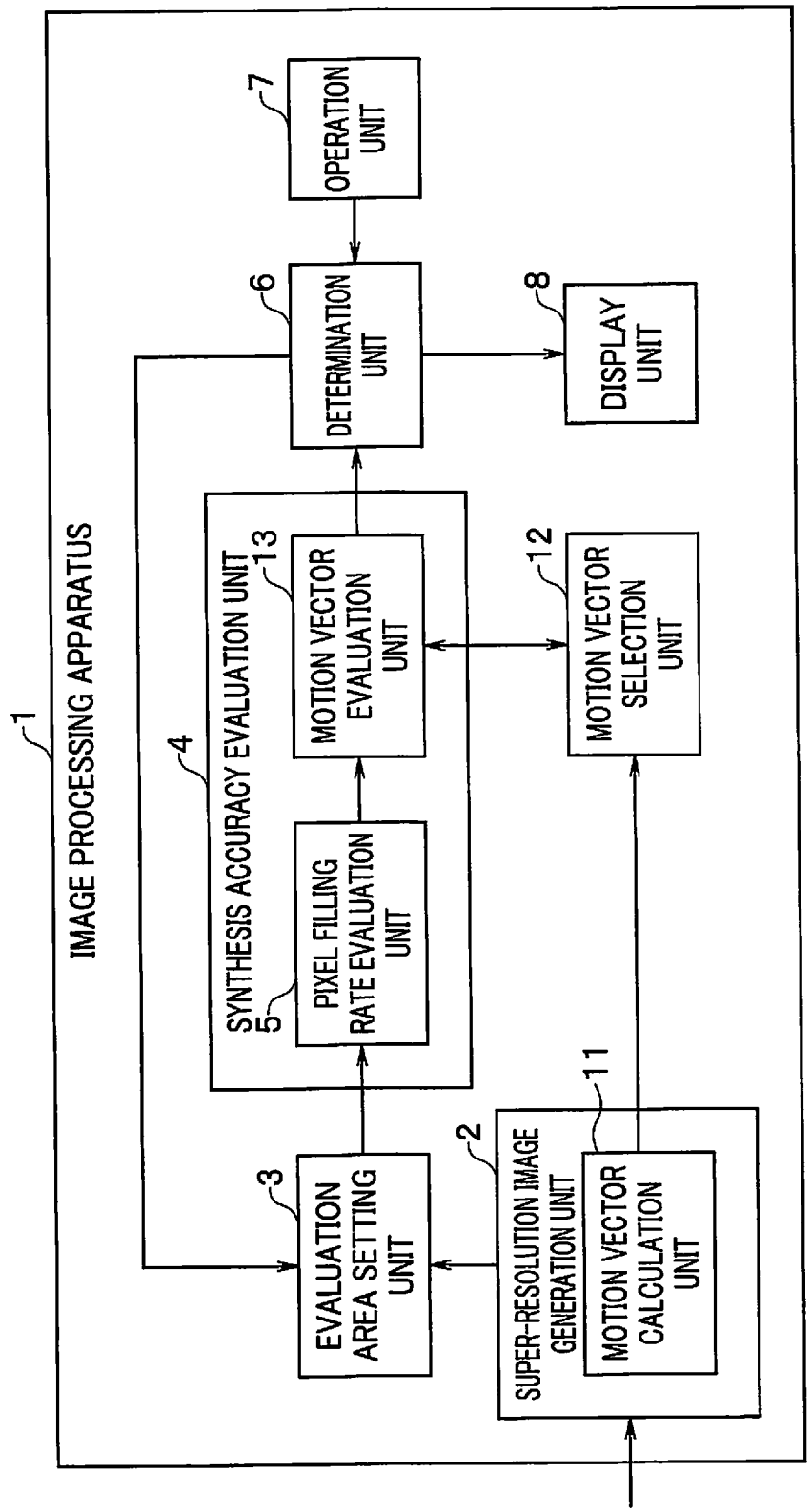
FIG. 15 is a block diagram illustrating a configuration example of an image processing apparatus according to a second embodiment of the present invention.

FIGS. 15 to 18 illustrate a second embodiment of the present invention, where FIG. 15 is a block diagram illustrating a configuration example of an image processing apparatus 1.

In the second embodiment, similar units to the units in the above-described first embodiment are respectively assigned the same reference numerals to omit description, as needed, and different points will be mainly described.

FIG. 15 illustrates an example using a motion vector evaluation value as a second evaluation value in addition to a pixel filling rate evaluation value.

The image processing apparatus 1 illustrated in FIG. 15 includes a super-resolution image generation unit 2, an evaluation area setting unit 3, a synthesis accuracy evaluation unit 4, a determination unit 6, an operation unit 7, a display unit 8, and a motion vector selection unit 12.

The synthesis accuracy evaluation unit 4 includes a pixel filling rate evaluation unit 5 and a motion vector evaluation unit 13.

The motion vector evaluation unit 13 acquires, among a plurality of evaluation areas set by the evaluation area setting unit 3, motion vectors, respectively, for only the specific evaluation areas for which a pixel filling rate evaluation value FillScore[i] calculated by the synthesis accuracy evaluation unit 4 is a value within a second predetermined range.

A flow of the acquisition of the motion vector by the motion vector evaluation unit 13 is as follows.

First, the super-resolution image generation unit 2 calculates the motion vector to align and arrange pixel data constituting an image obtained by photographing in a high-resolution image space. A vector calculation unit 11 included in the super-resolution image generation unit 2 calculates the motion vector, as described in the first embodiment (note that the super-resolution image generation unit 2 in the first embodiment also includes a motion vector calculation unit 11, which is not illustrated in FIG. 1. The same applies to a super-resolution image generation unit 2 illustrated in FIG. 16 and a super-resolution image generation unit 2 illustrated in FIG. 20 in a third embodiment, described below).

When a number of images used to generate a composite image is N (N is an integer of two or more), a motion vector is calculated for each of the second to N-th images as a change amount with respect to the first image, as described above. Specific examples of the motion vector include a motion vector of each of pixels constituting the second image with respect to the first image, a motion vector of each of pixels constituting the third image with respect to the first image, . . . , a motion vector of each of pixels constituting the N-th image with respect to the first image.

The respective motion vectors, calculated for each of the second to N-th images by the motion vector calculation unit 11, of all the pixels in the image (the motion vectors remaining after respective effects of translation and rotation of the entire image are removed, as described above, when an image pickup apparatus has not been fixed) are outputted to the motion vector selection unit 12. The motion vector selection unit 12 selects, among the respective motion vectors of the pixels calculated for each of the second to N-th images, the motion vector of each of the pixels calculated for any one of the images (e.g., the second image or the N-th image), for example. Alternatively, the motion vector selection unit 12 may calculate a motion vector obtained by averaging the respective motion vectors of the pixels calculated for each of the second to N-th images in units of pixels and use the calculated motion vector as a selection result.

The motion vector evaluation unit 13 acquires the motion vectors for the specific evaluation areas from the motion vector selection unit 12 and evaluates the acquired motion vectors, and calculates motion vector evaluation values, respectively, for the specific evaluation areas, as described below with reference to FIG. 18.

The determination unit 6 determines a determination area from among the specific evaluation areas based on the motion vector evaluation values. More specifically, the determination unit 6 determines the evaluation area having the maximum motion vector evaluation value, for example, as a determination area.

Thus, the determination unit 6 further determines, from among the specific evaluation areas narrowed down from among the plurality of evaluation areas based on a pixel filling rate evaluation value FillScore[i], a determination area based on the motion vector evaluation values.

Figure 16:
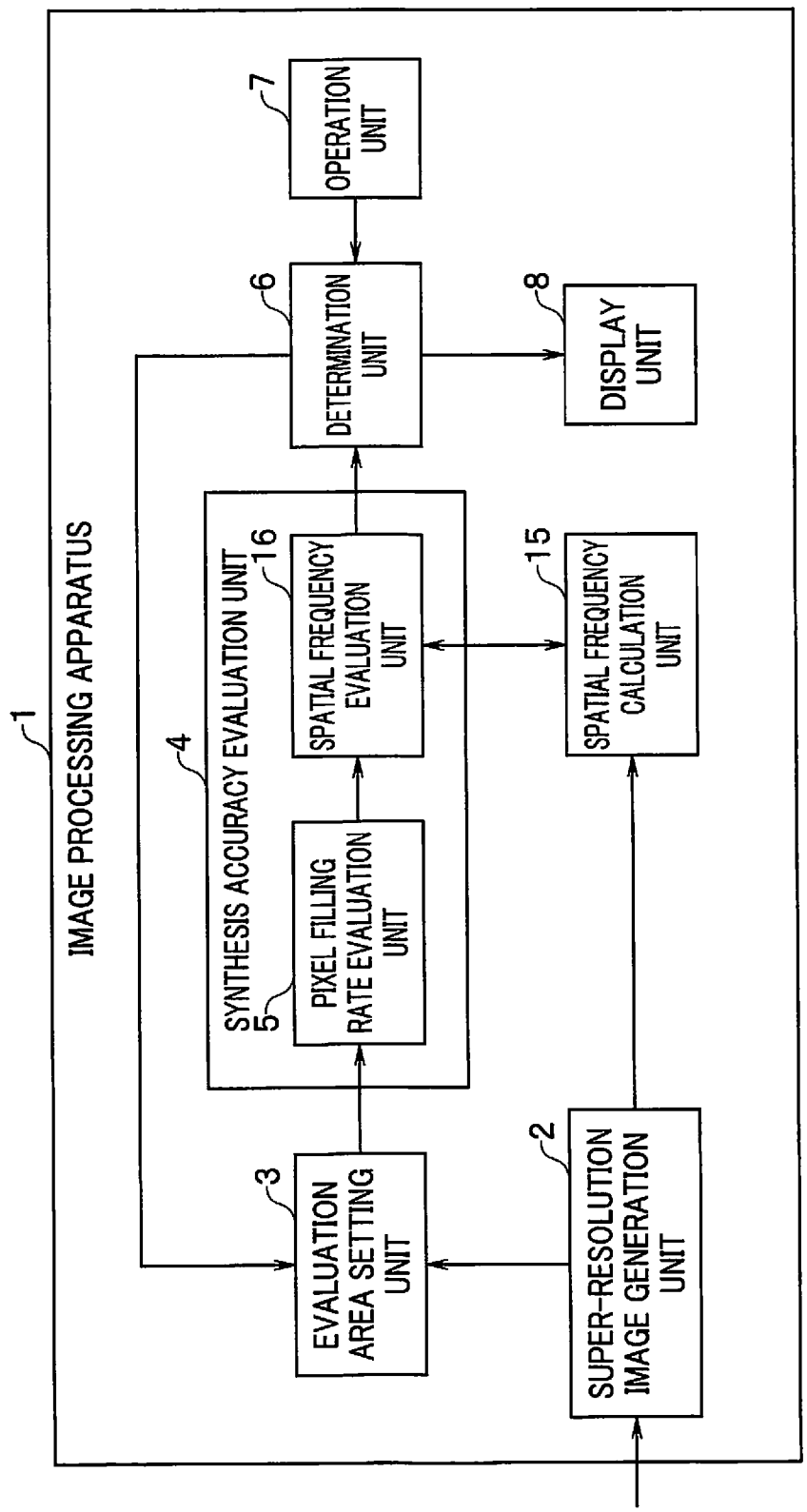
FIG. 16 is a block diagram illustrating another configuration example of the image processing apparatus according to the second embodiment.

FIG. 16 is a block diagram illustrating another configuration example of the image processing apparatus 1. Although FIG. 15 illustrates the example in which the motion vector evaluation value is used as the second evaluation value, FIG. 16 illustrates an example in which a spatial frequency evaluation value is used as a second evaluation value (an example in which a spatial frequency for an evaluation area is calculated and used instead of a motion vector).

The image processing apparatus 1 illustrated in FIG. 16 includes a super-resolution image generation unit 2, an evaluation area setting unit 3, a synthesis accuracy evaluation unit 4, a determination unit 6, an operation unit 7, a display unit 8, and a spatial frequency calculation unit 15.

The synthesis accuracy evaluation unit 4 includes a pixel filling rate evaluation unit 5 and a spatial frequency evaluation unit 16.

The spatial frequency calculation unit 15 calculates spatial frequencies, respectively, for only the above-described specific evaluation areas in a composite image generated by the super-resolution image generation unit 2 (a composite image after missing pixel interpolation has been performed) based on a command from the spatial frequency evaluation unit 16.

The spatial frequency calculation unit 15 calculates the spatial frequencies by filter calculation using a spatial frequency extraction filter, for example.

More specifically, when a size of the evaluation area is (W×H), a filter size of the spatial frequency extraction filter is (2K−D)×(2K−1), (x, y) is coordinates representing a pixel position in a horizontal direction and a vertical direction within the evaluation area, f(x, y) is a pixel value in the coordinates (x, y), and h(m, n) is a filter coefficient of the spatial frequency extraction filter in coordinates (m, n) in the filter size, the spatial frequency calculation unit 15 performs for each of the specific evaluation areas calculation as expressed by an equation 2 within the evaluation area, to calculate a spatial frequency g(x, y) in the coordinates (x, y).

$$g(x, y) = \sum_{n=-K}^{K} \sum_{m=-K}^{K} f(x+m, y+n) h(m, n) \quad \text{[Equation 2]}$$

An example of a filter coefficient of the spatial frequency extraction filter in a case of K=2 is expressed by an equation 3, and an example of a filter coefficient of the spatial frequency extraction filter in a case of K=3 is expressed by an equation 4.

$$h = \frac{1}{8} \times \begin{bmatrix} -1 & -1 & -1 \\ -1 & 8 & -1 \\ -1 & -1 & -1 \end{bmatrix} \quad \text{[Equation 3]}$$

$$h = \frac{1}{24} \times \begin{bmatrix} -1 & -1 & -1 & -1 & -1 \\ -1 & -1 & -1 & -1 & -1 \\ -1 & -1 & 24 & -1 & -1 \\ -1 & -1 & -1 & -1 & -1 \\ -1 & -1 & -1 & -1 & -1 \end{bmatrix} \quad \text{[Equation 4]}$$

When the spatial frequency g(x, y) thus calculated is integrated within the evaluation area, a spatial frequency G for the evaluation area is calculated, as expressed by an equation 5.

$$G = \sum_{x=K}^{H-K} \sum_{y=K}^{W-K} |g(x, y)| \quad \text{[Equation 5]}$$

The spatial frequency evaluation unit 16 evaluates the spatial frequencies G, respectively, for the specific evaluation areas calculated by the spatial frequency calculation unit 15, and calculates spatial frequency evaluation values, respectively, for the specific evaluation areas. The spatial frequency evaluation value calculated by the spatial frequency evaluation unit 16 is an evaluation value which increases when a value of a high-frequency component is large and decreases when the value of the high-frequency component is small.

The determination unit 6 determines a determination area from among the specific evaluation areas based on the spatial frequency evaluation values. More specifically, the determination unit 6 determines the evaluation area having the maximum spatial frequency evaluation value, for example, as a determination area.

Note that super-resolution confirmation area extraction processing and motion vector evaluation processing, described below, can be similarly applied if a motion vector is replaced with a spatial frequency. Accordingly, description is made by mainly taking a case where the motion vector is used (a case where a configuration illustrated in FIG. 15 is adopted) as an example.

Figure 17:
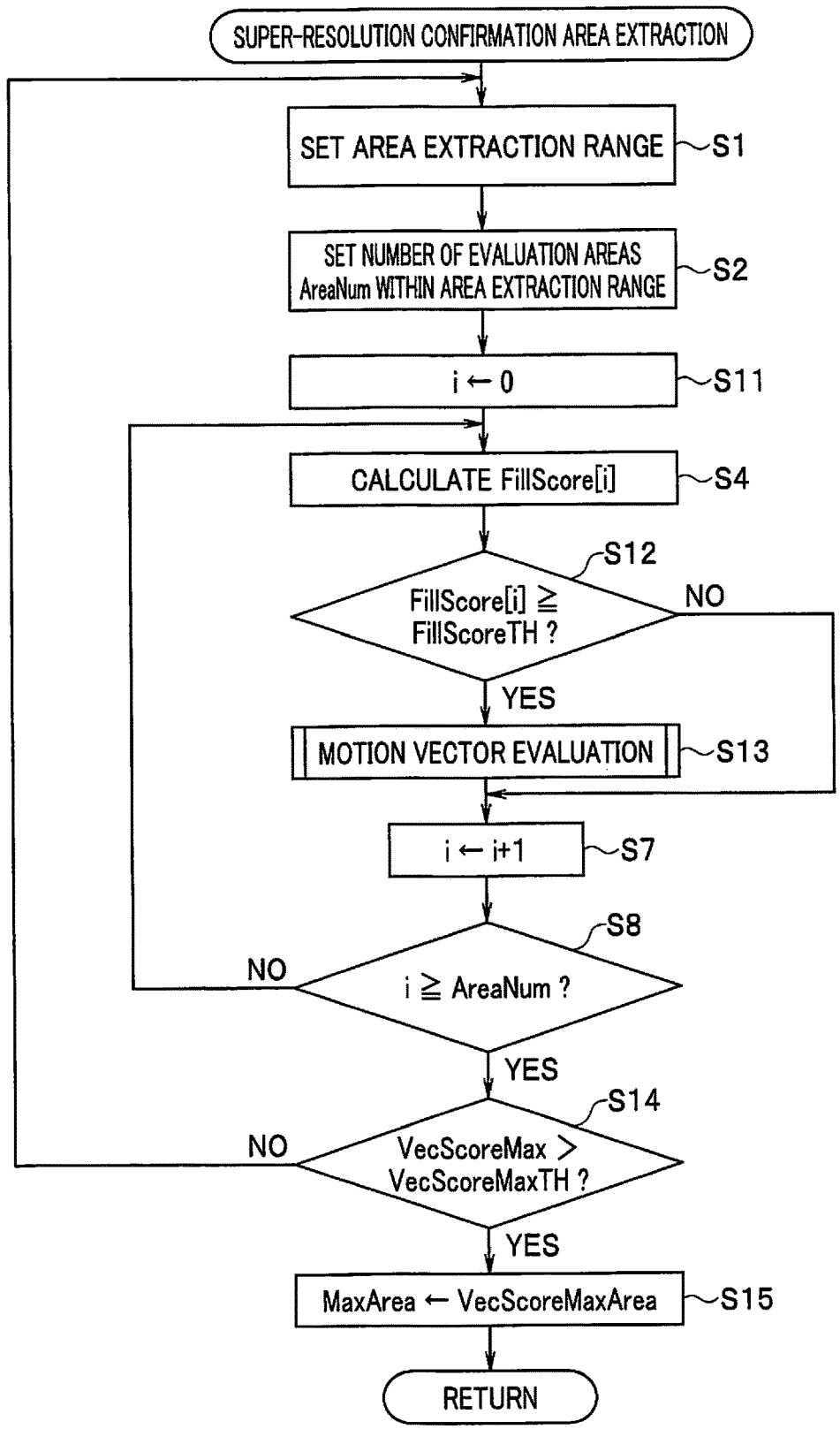
FIG. 17 is a flowchart illustrating super-resolution confirmation area extraction processing in the second embodiment.

FIG. 17 is a flowchart illustrating the super-resolution confirmation area extraction processing.

When main processing (not illustrated) proceeds to the processing, processes in step S1 and S2, described above, are performed, to set an area extraction range, an evaluation area, and a number of evaluation areas AreaNum.

Then, the synthesis accuracy evaluation unit 4 sets zero as an area number i for counting the number of evaluation areas AreaNum (step S11).

Then, a process in step S4, described above, is performed, and the pixel filling rate evaluation unit 5 calculates a pixel filling rate evaluation value FillScore[i] for the evaluation area assigned the area number i.

Further, the synthesis accuracy evaluation unit 4 judges whether or not the pixel filling rate evaluation value FillScore[i] is a predetermined pixel filling rate evaluation value threshold value FillScoreTH or more (step S12). The pixel filling rate evaluation value threshold value FillScoreTH is a threshold value for judging whether or not the evaluation area is left as a candidate for a determination area (i.e., is set as the specific evaluation area) depending on the pixel filling rate evaluation value FillScore[i].

If it is judged that the pixel filling rate evaluation value FillScore[i] is the pixel filling rate evaluation value threshold value FillScoreTH or more, the motion vector evaluation unit 13 performs the motion vector evaluation processing as described below with reference to FIG. 18 (step S13). Thus, the evaluation area for which the pixel filling rate evaluation value FillScore[i] is the pixel filling rate evaluation value threshold value FillScoreTH or more is set as the specific evaluation area.

If a process in step S13 is performed or if it is judged in step S12 that the pixel filling rate evaluation value FillScore[i] is less than the pixel filling rate evaluation value threshold value FillScoreTH, the synthesis accuracy evaluation unit 4 performs a process in step S7, described above, to increase a value of the area number i by one.

Thus, the synthesis accuracy evaluation unit 4 acquires, among the plurality of evaluation areas set by the evaluation area setting unit 3, motion vectors for only the specific evaluation areas for which the pixel filling rate evaluation value FillScore[i] is a value within a second predetermined range (a range of the pixel filing rate evaluation value threshold value FillScoreTH or more) and evaluates the acquired motion vectors, to calculate a motion vector evaluation value for each of the specific evaluation areas. Therefore, the synthesis accuracy evaluation unit 4 does not perform the motion vector evaluation processing in step S13 when it is judged that the pixel filling rate evaluation value FillScore[i] is less than the pixel filling rate evaluation value threshold value FillScoreTH.

Then, the synthesis accuracy evaluation unit 4 performs a process in step S8, described above, to judge whether or not the area number i has reached the number of evaluation areas AreaNum.

If it is judged in step S8 that the area number i has not reached the number of evaluation areas AreaNum, the processing returns to step S4, described above. In step S4, the above-described processing is performed for the subsequent evaluation area.

Thus, if it is judged in step S8 that the area number i has reached the number of evaluation areas AreaNum, the synthesis accuracy evaluation unit 4 judges whether or not a maximum value VecScoreMax of the motion vector evaluation values is more than a predetermined focusing confirmation area judgment threshold value VecScoreMaxTH (step S14). The maximum value VecScoreMax of the motion vector evaluation values is the maximum motion vector evaluation value among the motion vector evaluation values calculated by the motion vector evaluation unit 13. The focusing confirmation area judgment threshold value VecScoreMaxTH is a threshold value used for judgment not to set the evaluation area for which the motion vector evaluation value is VecScoreMaxTH or less as a determination area.

If it is judged in step S14 that VecScoreMax is not more than VecScoreMaxTH, the processing returns to step S1, described above. In step S1, the evaluation area setting unit 3 resets the area extraction range and the evaluation areas, and then the above-described processing is performed.

Thus, the synthesis accuracy evaluation unit 4 judges whether or not the maximum value VecScoreMax of the motion vector evaluation values is a value within a third predetermined range (a range more than the focusing confirmation area judgment threshold value VecScoreMaxTH), and causes the evaluation area setting unit 3 to reset the area extraction range and the plurality of evaluation areas when VecScoreMax is not a value within the third predetermined range. Accordingly, the synthesis accuracy evaluation unit 4 processes the reset plurality of evaluation areas again.

On the other hand, if the synthesis accuracy evaluation unit 4 judges in step S14 that VecScoreMax is more than VecScoreMaxTH, the determination unit 6 sets a value of an area number VecScoreMaxArea in which the motion vector evaluation value reaches a maximum as a maximum evaluation value area number MaxArea, and determines the evaluation area indicated by the maximum evaluation value area number MaxArea as a determination area (step S15). As a result, the determination area determined by the determination unit 6 is displayed on the display unit 8, like in the above-described first embodiment.

Then, the processing returns to the main processing (not illustrated).

Figure 18:
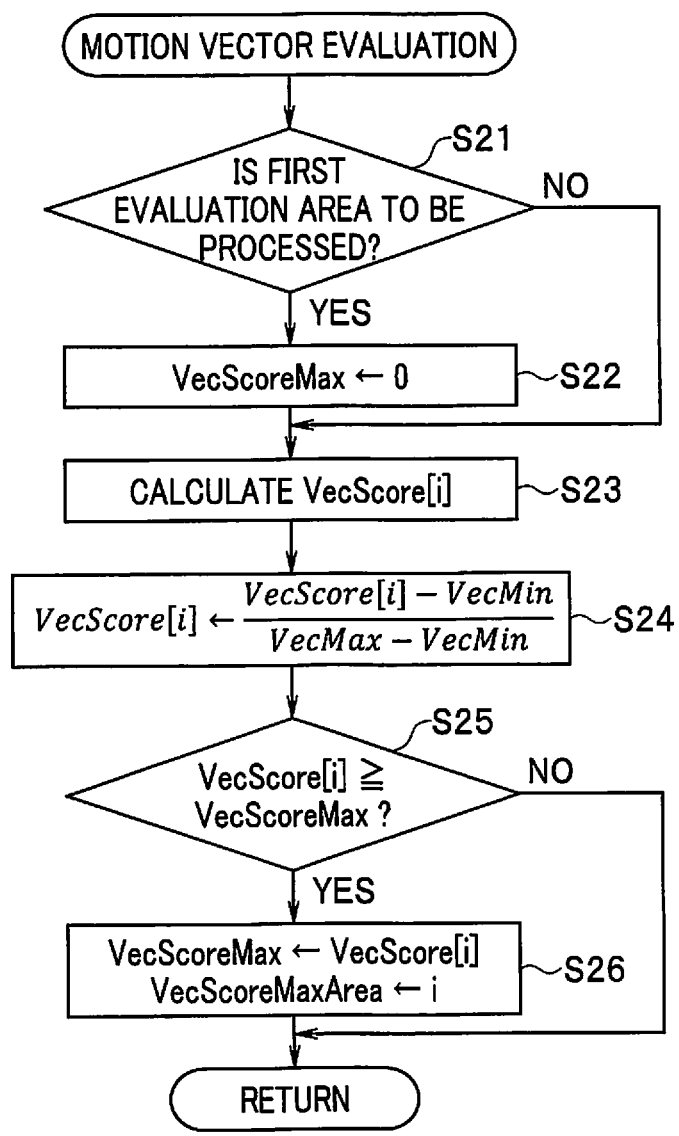
FIG. 18 is a flowchart illustrating details of motion vector evaluation processing in step S13 illustrated in FIG. 17 in the second embodiment.

FIG. 18 is a flowchart illustrating details of the motion vector evaluation processing in step S13 illustrated in FIG. 17.

When the processing is started, the motion vector evaluation unit 13 judges whether or not the evaluation area to be processed is the first evaluation area where the motion vector evaluation processing is performed (step S21).

If it is judged in step S21 that the evaluation area to be processed is the first evaluation area, the motion vector evaluation unit 13 initializes the maximum value VecScoreMax of the motion vector evaluation values, and sets the maximum value VecScoreMax to zero (step S22).

On the other hand, if it is judged in step S21 that the evaluation area to be processed is not the first evaluation area, the maximum value VecScoreMax of the motion vector evaluation values is not initialized.

The motion vector evaluation unit 13 calculates a motion vector evaluation value VecScore[i] for the evaluation area assigned the area number i (step S23). The motion vector evaluation value VecScore[i] is calculated in the following manner, for example.

That is, the motion vector evaluation unit 13 receives a motion vector Vec(x, y) at a pixel position (x, y) in the evaluation area assigned the area number i from the motion vector selection unit 12, and performs calculation as expressed by an equation 6, for example, to calculate the motion vector evaluation value VecScore[i] for the evaluation area assigned the area number i.

$$VecScore[i] \leftarrow \frac{1}{\sum_{x=1}^{H} \sum_{y=1}^{W} |Vec(x, y)|}$$ [Equation 6]

Note that the motion vector evaluation value VecScore[i] is set such that the smaller the magnitude of the motion vector within the evaluation area is, the larger the motion vector evaluation value VecScore[i] becomes. An example in which a reciprocal of a value obtained by integrating a magnitude |Vec(x, y)| of the motion vector for each of pixels within the evaluation area is set as the motion vector evaluation value VecScore[i] has been described. However, the present invention is not limited to this. Another appropriate value may be set as the motion vector evaluation value VecScore[i].

If the spatial frequency is evaluated, the spatial frequency evaluation value, which increases when a value of a high-frequency component is large and decreases when the value of the high-frequency component is small, is used, as described above.

Then, the motion vector evaluation unit 13 performs normalization such that the motion vector evaluation value VecScore[i] is not less than 0 nor more than 1 (step S24). As an example, normalization is performed, as expressed by an equation 7, using a minimum value VecMin of values which can be taken as the motion vector evaluation value VecScore[i] and a maximum value VecMax of the values which can be taken as the motion vector evaluation value VecScore[i].

$$VecScore[i] \leftarrow \frac{VecScore[i] - VecMin}{VecMax - VecMin} \quad \text{[Equation 7]}$$

Note that even after the motion vector evaluation value VecScore[i] is calculated for all the specific evaluation areas, the minimum value VecMin and the maximum value VecMax may be respectively a minimum value and a maximum value of the calculated motion vector evaluation values VecScore[i].

The spatial frequency evaluation value is also similarly normalized to be a value of not less than 0 nor more than 1.

The motion vector evaluation unit 13 judges whether or not the motion vector evaluation value VecScore[i] thus normalized is the maximum value VecScoreMax or more of the current motion vector evaluation values (step S25).

If it is judged in step S25 that VecScore[i] is VecScoreMax or more, the motion vector evaluation unit 13 sets the motion vector evaluation value VecScore[i] calculated in step S24 to the maximum value VecScoreMax of the motion vector evaluation values while setting the value of the area number i to an area number VecScoreMaxArea in which the motion vector evaluation value reaches a maximum (step S26).

If a process in step S26 is performed or if it is judged in step S25 that VecScore[i] is less than VecScoreMax, the processing returns to step S17.

Note that in processes in steps S25, S26, and S15, described above, if there exist a plurality of evaluation areas for which the motion vector evaluation value reaches a maximum value, a value of the area number i assigned to the evaluation area finally found is set as the maximum evaluation value area number MaxArea, to determine a determination area. However, it is needless to say that the present invention is not limited to this.

That is, if the plurality of evaluation areas for which the motion vector evaluation value reaches a maximum value exist, the determination unit 6 may select any one of the evaluation areas as a determination area, as described above, or may set all of the one or more evaluation areas for which the motion vector evaluation value reaches a maximum value, respectively, as determination areas, for example.

Although the determination unit 6 sets the evaluation area for which the motion vector evaluation value reaches a maximum value as a determination area in the foregoing, the present invention is not limited to this. A determination area may be determined in response to an operation input from the operation unit 7. For example, the determination unit 6 sets the evaluation area for which the motion vector evaluation value reaches a maximum value as a determination area when a specific user operation is not performed, sets the evaluation area for which the motion vector evaluation value reaches a second largest value as a determination area when the specific user operation is performed once, and sets the evaluation area for which the motion vector evaluation value reaches a third largest value as a determination area when the specific user operation is performed two times.

Further, although either one of the motion vector evaluation value and the spatial frequency evaluation value is used as the second evaluation value in the foregoing, both the motion vector evaluation value and the spatial frequency evaluation value may be used as the second evaluation value. For example, a value obtained by weighting, adding, and averaging the normalized motion vector evaluation value and the normalized spatial frequency evaluation value by a weight corresponding to a degree of importance may be used as the second evaluation value.

According to the second embodiment, a substantially similar effect to the effect in the above-described first embodiment is produced while not only the pixel filling rate evaluation value but also at least one of the motion vector evaluation value and the spatial frequency evaluation value is used. Accordingly, a determination area where synthesis accuracy is easily confirmed (further, a determination area where focusing is easily confirmed) can be more appropriately extracted.

The motion vector or the spatial frequency is evaluated for only the specific evaluation areas for which the pixel filling rate evaluation value is a value within the second predetermined range. Accordingly, a processing load can be reduced more than when the motion vector or the spatial frequency is evaluated for all the plurality of evaluation areas set by the evaluation area setting unit 3.

Further, when the maximum value VecScoreMax of the motion vector evaluation values is not a value within the third predetermined range, the area extraction range and the plurality of evaluation areas are reset. Accordingly, an area where the motion vector evaluation value is higher can be selected as a determination area.

Similarly, when a maximum value of the spatial frequency evaluation values is not a value within a 3'-th predetermined range, the area extraction range and the plurality of evaluation areas are reset. Accordingly, an area where the spatial frequency evaluation value is higher can be selected as a determination area.

The evaluation area having the maximum motion vector evaluation value which is judged to be a value within the third predetermined range is determined as a determination area. Accordingly, synthesis accuracy can be always confirmed in a determination area where movement of an object is small and synthesis has been appropriately performed.

Similarly, the evaluation area having the maximum spatial frequency evaluation value which is judged to be a value within the 3'-th predetermined range is determined as a determination area. Accordingly, synthesis accuracy and focusing can be always confirmed in a determination area where a spatial frequency is high, i.e., a resolution is high.

Third Embodiment

Figure 19:
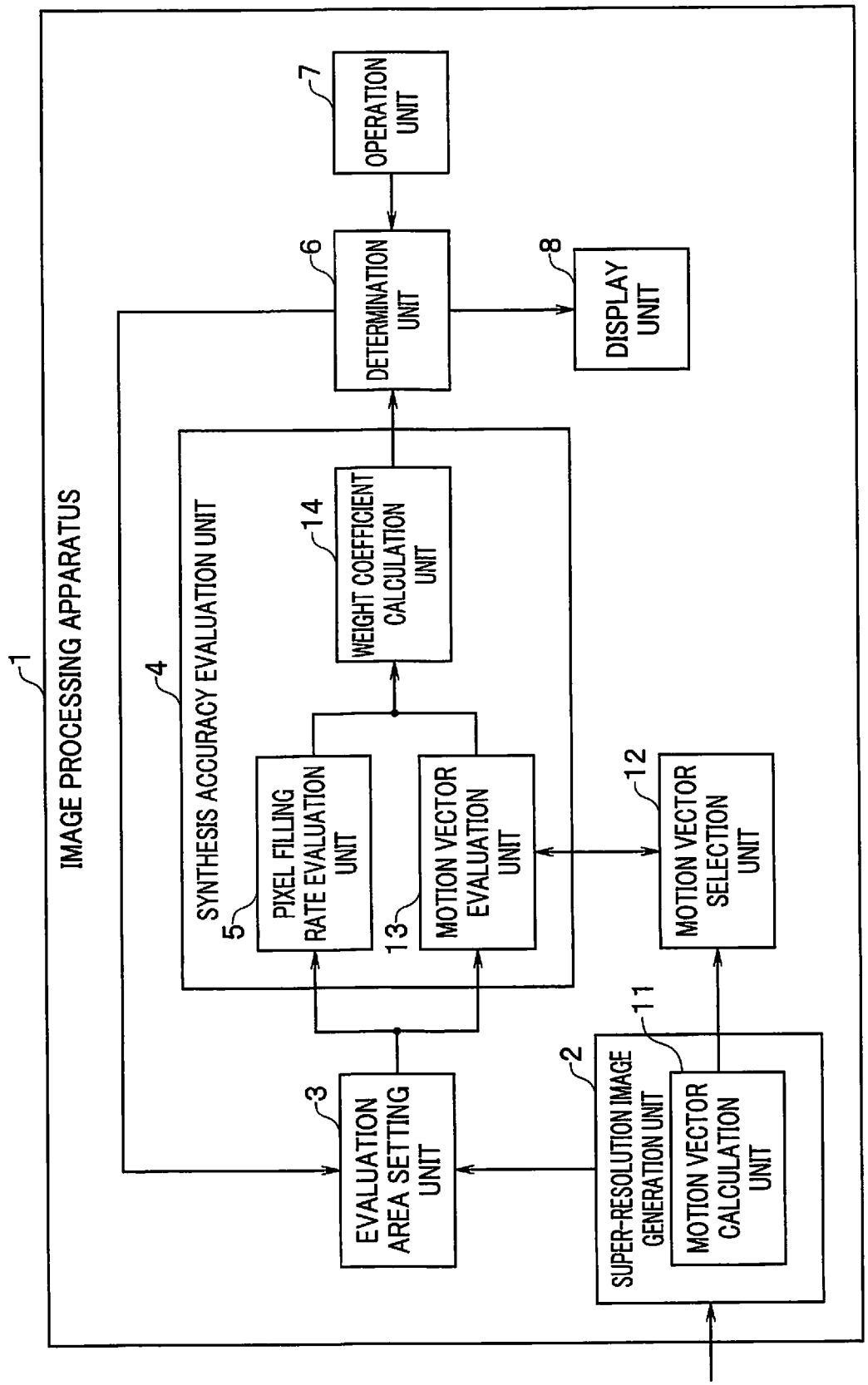
FIG. 19 is a block diagram illustrating a configuration example of an image processing apparatus according to a third embodiment of the present invention.

FIGS. 19 to 25 illustrate a third embodiment of the present invention, where FIG. 19 is a block diagram illustrating a configuration example of an image processing apparatus 1.

In the third embodiment, similar units to the units in the above-described first and second embodiments are respectively assigned the same reference numerals to omit description, as needed, and different points will be mainly described.

FIG. 19 illustrates an example in which a value obtained by weighting and adding a pixel filling rate evaluation value and a motion vector evaluation value is set as an overall evaluation value, to determine a determination area based on the overall evaluation value.

The image processing apparatus 1 illustrated in FIG. 19 includes a super-resolution image generation unit 2, an evaluation area setting unit 3, a synthesis accuracy evaluation unit 4, a determination unit 6, an operation unit 7, a display unit 8, and a motion vector selection unit 12.

The synthesis accuracy evaluation unit 4 includes a pixel filling rate evaluation unit 5, a motion vector evaluation unit 13, and a weight coefficient calculation unit 14.

The pixel filling rate evaluation unit 5 in the present embodiment not only calculates a plurality of pixel filling rate evaluation values FillScore[i], respectively, for a plurality of evaluation areas but also calculates an average value FillScoreAve and a variance value FillScoreVar of the plurality of pixel filling rate evaluation values.

The motion vector evaluation unit 13 in the present embodiment evaluates, for each of the plurality of evaluation areas, a motion vector for the evaluation area, to calculate a plurality of motion vector evaluation values VecScore[i]. Therefore, the motion vector evaluation unit 13 in the present embodiment calculates the motion vector evaluation values VecScore[i], respectively, for all the plurality of evaluation areas set by the evaluation area setting unit 3, unlike in the above-described second embodiment.

Further, the motion vector evaluation unit 13 calculates an average value VecScoreAve and a variance value VecScoreVar of the plurality of motion vector evaluation values, respectively, for the plurality of evaluation areas.

The weight coefficient calculation unit 14 calculates, based on the average value FillScoreAve and the variance value FillScoreVar of the pixel filling rate evaluation values and the average value VecScoreAve and the variance value VecScoreVar of the motion vector evaluation values, a first weight coefficient FillWgt for each of the pixel filling rate evaluation values FillScore[i] and a second weight coefficient VecWgt for each of the motion vector evaluation values VecScore[i].

Further, the weight coefficient calculation unit 14 sets a value obtained by adding the pixel filling rate evaluation value FillScore[i] multiplied by the first weight coefficient FillWgt and the motion vector evaluation value VecScore[i] multiplied by the second weight coefficient VecWgt as an overall evaluation value Score[i], to calculate the overall evaluation values Score[i], respectively, for the plurality of evaluation areas.

The determination unit 6 determines the evaluation area for which the overall evaluation value Score[i] reaches a maximum value as a determination area.

Figure 20:
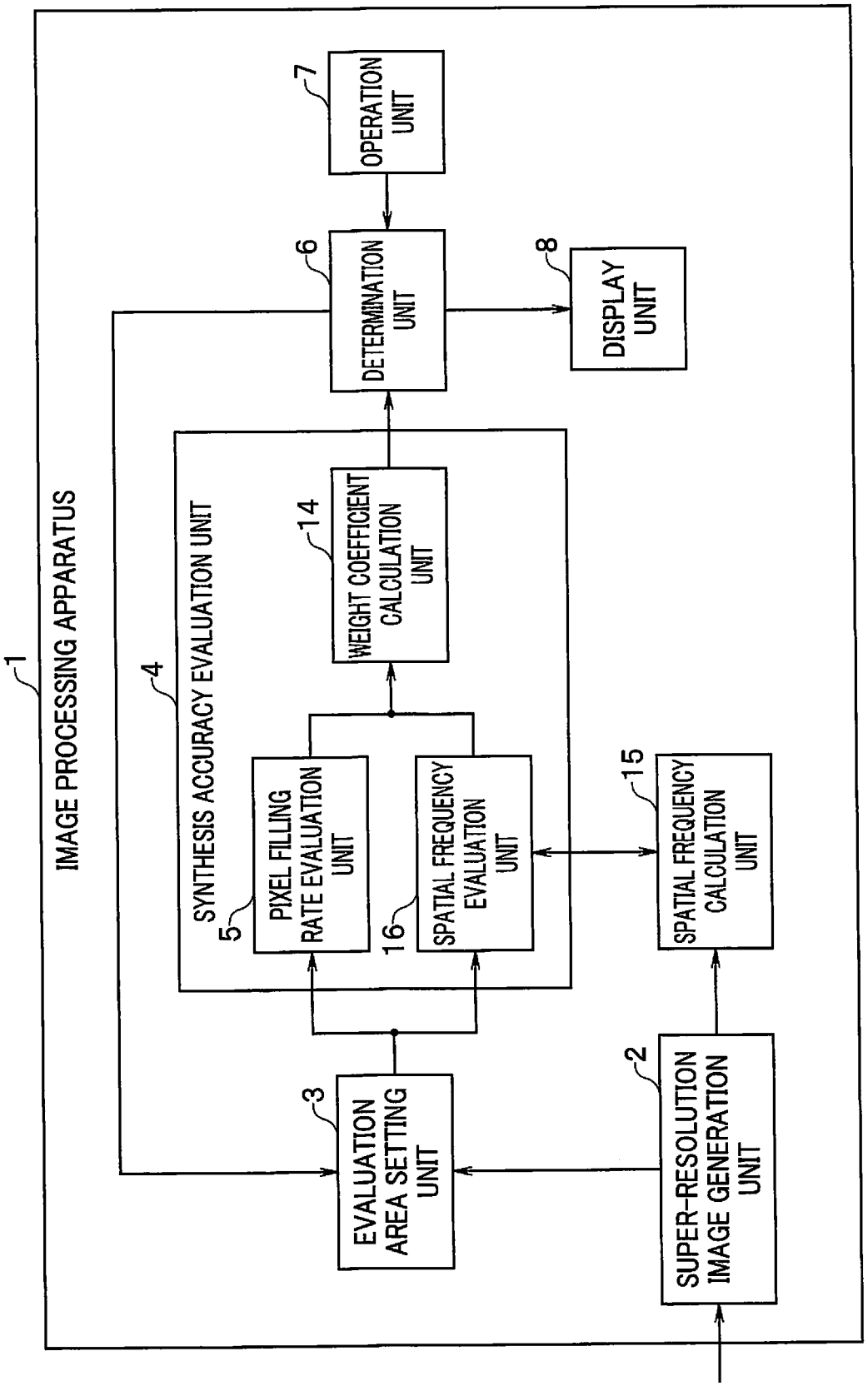
FIG. 20 is a block diagram illustrating another configuration example of the image processing apparatus according to the third embodiment.

FIG. 20 is a block diagram illustrating another configuration example of the image processing apparatus 1. FIG. 20 illustrates an example in which a spatial frequency for an evaluation area is calculated and used instead of the motion vector illustrated in FIG. 19.

An image processing apparatus 1 illustrated in FIG. 20 includes a super-resolution image generation unit 2, an evaluation area setting unit 3, a synthesis accuracy evaluation unit 4, a determination unit 6, an operation unit 7, a display unit 8, and a spatial frequency calculation unit 15.

The synthesis accuracy evaluation unit 4 includes a pixel filling rate evaluation unit 5, a spatial frequency evaluation unit 16, and a weight coefficient calculation unit 14.

The pixel filling rate evaluation unit 5 not only calculates a plurality of pixel filling rate evaluation values FillScore[i], respectively, for a plurality of evaluation areas but also calculates an average value FillScoreAve and a variance value FillScoreVar of the plurality of pixel filling rate evaluation values, as described above.

The spatial frequency evaluation unit 16 in the present embodiment evaluates, for each of the plurality of evaluation areas, a spatial frequency for the evaluation area, to calculate a plurality of spatial frequency evaluation values. Therefore, the spatial frequency evaluation unit 16 in the present embodiment calculates the spatial frequency evaluation values, respectively, for all the plurality of evaluation areas set by the evaluation area setting unit 3, unlike in the above-described second embodiment.

Further, the spatial frequency evaluation unit 16 calculates an average value and a variance value of the plurality of spatial frequency evaluation values, respectively, for the plurality of evaluation areas.

The weight coefficient calculation unit 14 calculates, based on the average value FillScoreAve and the variance value FillScoreVar of the pixel filling rate evaluation values and the average value and the variance value of the spatial frequency evaluation values, a first weight coefficient FillWgt for each of the pixel filling rate evaluation values FillScore[i] and a second weight coefficient VecWgt for each of the spatial frequency evaluation values.

Further, the weight coefficient calculation unit 14 sets a value obtained by adding the pixel filling rate evaluation value FillScore[i] multiplied by the first weight coefficient FillWgt and the spatial frequency evaluation value multiplied by the second weight coefficient VecWgt as an overall evaluation value Score[i], to calculate the overall evaluation values Score[i], respectively, for the plurality of evaluation areas.

The determination unit 6 determines the evaluation area for which the overall evaluation value Score[i] reaches a maximum value as a determination area.

Note that super-resolution confirmation area extraction processing and motion vector evaluation processing, described below, can be similarly applied if the motion vector is replaced with the spatial frequency. Accordingly, description is made below by mainly taking a case where the motion vector is used (a case where the configuration illustrated in FIG. 15 is adopted) as an example.

Figure 21:
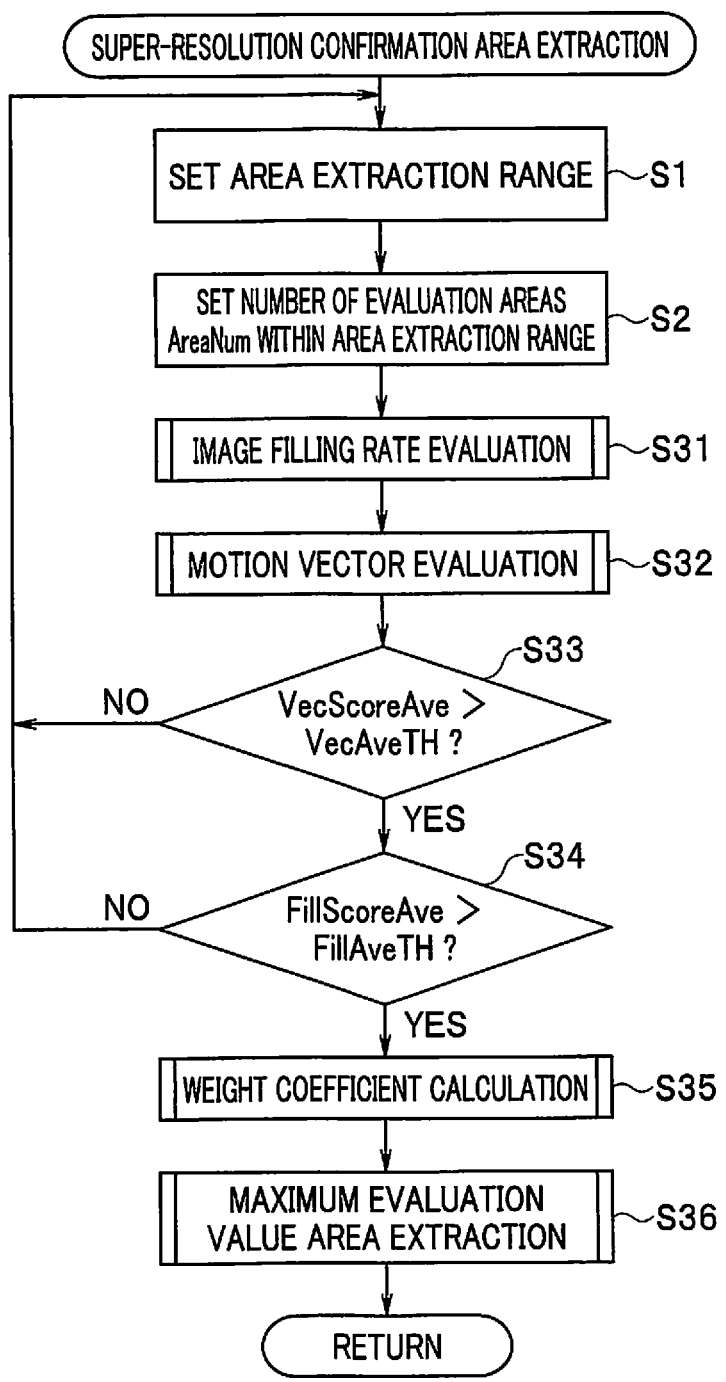
FIG. 21 is a flowchart illustrating super-resolution confirmation area extraction processing in the third embodiment.

FIG. 21 is a flowchart illustrating the super-resolution confirmation area extraction processing.

When main processing (not illustrated) proceeds to the processing, processes in step S1 and S2, described above, are performed, to set an area extraction range, evaluation areas, and a number of evaluation areas AreaNum.

Then, the pixel filling rate evaluation unit 5 performs pixel filling rate evaluation processing, as described below with reference to FIG. 22 (step S31).

Then, the motion vector evaluation unit 13 performs the motion vector evaluation processing, as described below with reference to FIG. 23 (step S32).

The synthesis accuracy evaluation unit 4 judges whether or not an average value VecScoreAve of motion vector evaluation values calculated by a process in step S32 is more than a threshold value VecAveTH of the average value of the motion vector evaluation values (step S33). The threshold value VecAveTH of the average value of the motion vector evaluation values is a threshold value used for judgment not to set the evaluation area for which the average value VecScoreAve of the motion vector evaluation values is VecAveTH or less as a determination area.

If it is judged in step S33 that VecScoreAve is not more than VecAveTH, the processing returns to step S1, described above. In step S1, the evaluation area setting unit 3 resets the area extraction range and the evaluation areas, and then the above-described processing is performed.

If it is judged in step S33 that VecScoreAve is more than VecAveTH, the synthesis accuracy evaluation unit 4 further judges whether or not the average value FillScoreAve of the pixel filling rate evaluation values calculated by a process in step S31 is more than the threshold value FillAveTH of the average value of the pixel filling rate evaluation values (step S34). The threshold value FillAveTH of the average value of the pixel filling rate evaluation values is a threshold value used for judgment not to set the evaluation area for which the average value FillScoreAve of the pixel filling rate evaluation values is the threshold value FillAveTH or less.

If it is judged in step S34 that FillScoreAve is not more than FillAveTH, the processing returns to step S1, described above. In step S1, the evaluation area setting unit 3 resets the area extraction range and the evaluation areas, and then the above-described processing is performed.

Thus, the synthesis accuracy evaluation unit 4 causes, when at least one of judgment that the average value FillScoreAve of the pixel filling rate evaluation values is a value outside a fourth predetermined range (here, is not more than the threshold value FillAveTH of the average value of the pixel filling rate evaluation values) and judgment that the average value VecScoreAve of the motion vector evaluation values is a value outside a fifth predetermined range (here, is not more than the threshold value VecAveTH of the average value of the motion vector evaluation values) holds, the evaluation area setting unit 3 to reset the area extraction range and the plurality of evaluation areas. As a result, the synthesis accuracy evaluation unit 4 processes the reset plurality of evaluation areas again.

Although in a flow of the processing illustrated in FIG. 21, the pixel filling rate evaluation processing in step S31, the motion vector evaluation processing in step S32, the processing for judging the average value VecScoreAve of the motion vector evaluation values in step S33, and the processing for judging the average value FillScoreAve of the pixel filling rate evaluation values in step S34 have been performed in this order, the present invention is not limited to this. If the processing in step S32, the processing in step S33, the processing in step S31, and the processing in step S34 are performed in this order, for example, the processing in step S31 need not be performed when the judgment in step S33 is "NO" so that a processing load can be reduced. Similarly, if the processing in step S31, the processing in step S34, the processing in step S32, and the processing in step S33 are performed in this order, for example, the processing in step S32 need not be performed when the judgment in step S34 is "NO" so that a processing load can be reduced.

If it is judged in step S34 illustrated in FIG. 21 that FillScoreAve is more than FillAveTH, the weight coefficient calculation unit 14 performs weight coefficient calculation processing, as described below with reference to FIG. 24 (step S35).

Then, the determination unit 6 performs maximum evaluation value area extraction processing, as described below with reference to FIG. 25, to determine a determination area (step S36). As a result, the determination area determined by the determination unit 6 is displayed on the display unit 8, like in the above-described first embodiment.

Then, the processing returns to the main processing (not illustrated).

Figure 22:
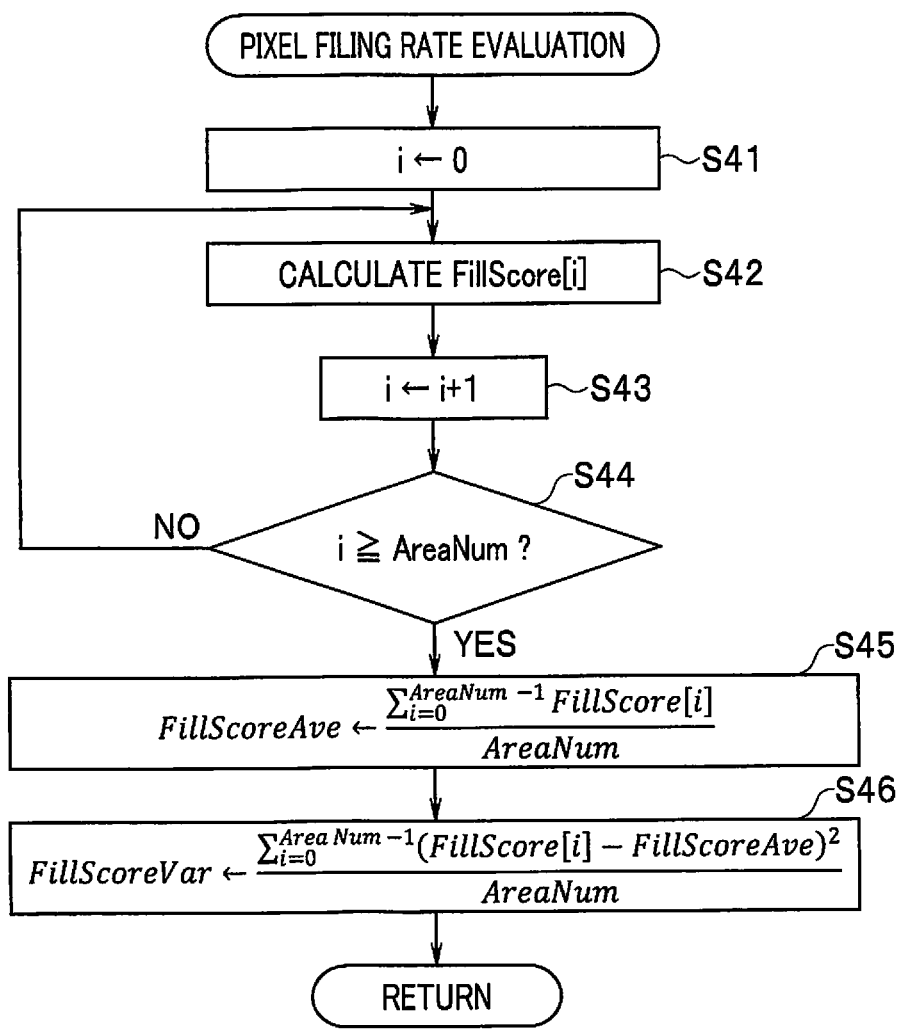
FIG. 22 is a flowchart illustrating details of pixel filling rate evaluation processing in step S31 illustrated in FIG. 21 in the third embodiment.

FIG. 22 is a flowchart illustrating details of the pixel filling rate evaluation processing in step S31 illustrated in FIG. 21.

When the processing is started, the pixel filling rate evaluation unit 5 sets zero as an area number i for counting the number of evaluation areas (step S41).

Then, the pixel filling rate evaluation unit 5 calculates a pixel filling rate evaluation value FillScore[i] for the evaluation area assigned the area number i, like in the above-described first embodiment (step S42).

Then, the pixel filling rate evaluation unit 5 adds a value of the area number i by one (step S43).

The pixel filling rate evaluation unit 5 judges whether or not the area number i has reached the number of evaluation areas AreaNum (step S44).

If it is judged in step S44 that the area number i has not reached the number of evaluation areas AreaNum, the processing returns to step S42, described above. In step S42, the above-described processing is performed for the subsequent evaluation area.

Thus, if it is judged in step S44 that the area number i has reached the number of evaluation areas AreaNum, the pixel filling rate evaluation unit 5 calculates an average value FillScoreAve of the pixel filling rate evaluation values, as expressed by an equation 8 (step S45).

$$FillScoreAve \leftarrow \frac{\sum_{i=0}^{AreaNum-1} FillScore[i]}{AreaNum} \quad \text{[Equation 8]}$$

Further, the pixel filling rate evaluation unit 5 calculates a variance value FillScoreVar of the pixel filling rate evaluation values, as expressed by an equation 9 (step S46).

$$FillScoreVar \leftarrow \frac{\sum_{i=0}^{AreaNum-1} (FillScore[i] - FillScoreAve)^2}{AreaNum} \quad \text{[Equation 9]}$$

Then, the processing returns to the processing illustrated in FIG. 21.

Figure 23:
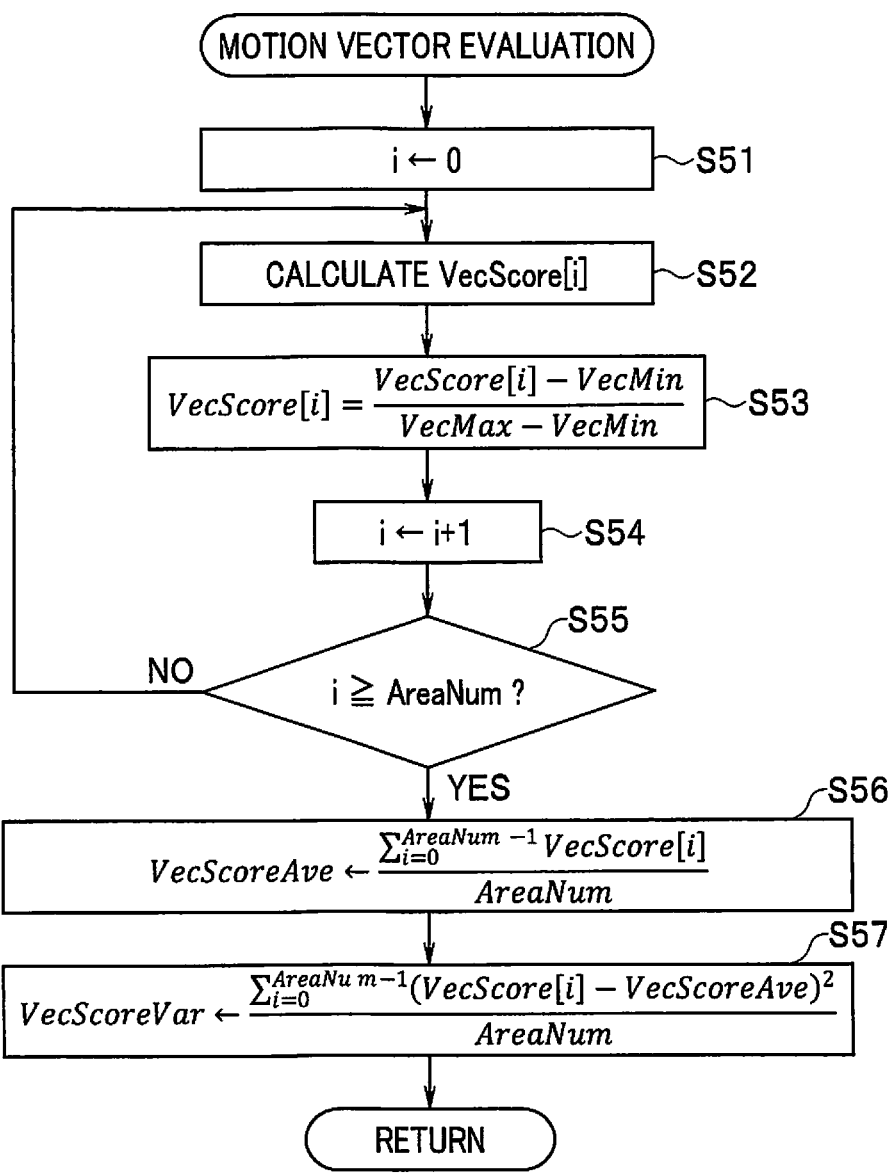
FIG. 23 is a flowchart illustrating details of motion vector evaluation processing in step S32 illustrated in FIG. 21 in the third embodiment.

FIG. 23 is a flowchart illustrating details of the motion vector evaluation processing in step S32 illustrated in FIG. 21.

When the processing is started, the motion vector evaluation unit 13 sets zero as the area number i for counting the number of evaluation areas (step S51).

Then, the motion vector evaluation unit 13 calculates a motion vector evaluation value VecScore[i] for the evaluation area assigned the area number i, as described in step S23 in the above-described second embodiment (step S52).

Then, the motion vector evaluation unit 13 normalizes the motion vector evaluation value VecScore[i], as expressed by an equation 7, for example (step S53).

Further, the motion vector evaluation unit 13 adds a value of the area number i by one (step S54).

The motion vector evaluation unit 13 judges whether or not the area number i has reached the number of evaluation areas AreaNum (step S55).

If it is judged in step S55 that the area number i has not reached the number of evaluation areas AreaNum, the processing returns to step S52, described above. In step S52, the above-described processing is performed for the subsequent evaluation area.

Thus, if it is judged in step S55 that the area number i has reached the number of evaluation areas AreaNum, the motion vector evaluation unit 13 calculates an average value VecScoreAve of the motion vector evaluation values, as expressed by an equation 10 (step S56).

$$VecScoreAve \leftarrow \frac{\sum_{i=0}^{AreaNum-1} VecScore[i]}{AreaNum} \quad \text{[Equation 10]}$$

Further, the motion vector evaluation unit 13 calculates a variance value VecScoreVar of the motion vector evaluation values, as expressed by an equation 11 (step S57).

$$VecScoreVar \leftarrow \frac{\sum_{i=0}^{AreaNum-1} (VecScore[i] - VecScoreAve)^2}{AreaNum} \quad \text{[Equation 11]}$$

Then, the processing returns to the processing illustrated in FIG. 21.

Figure 24:
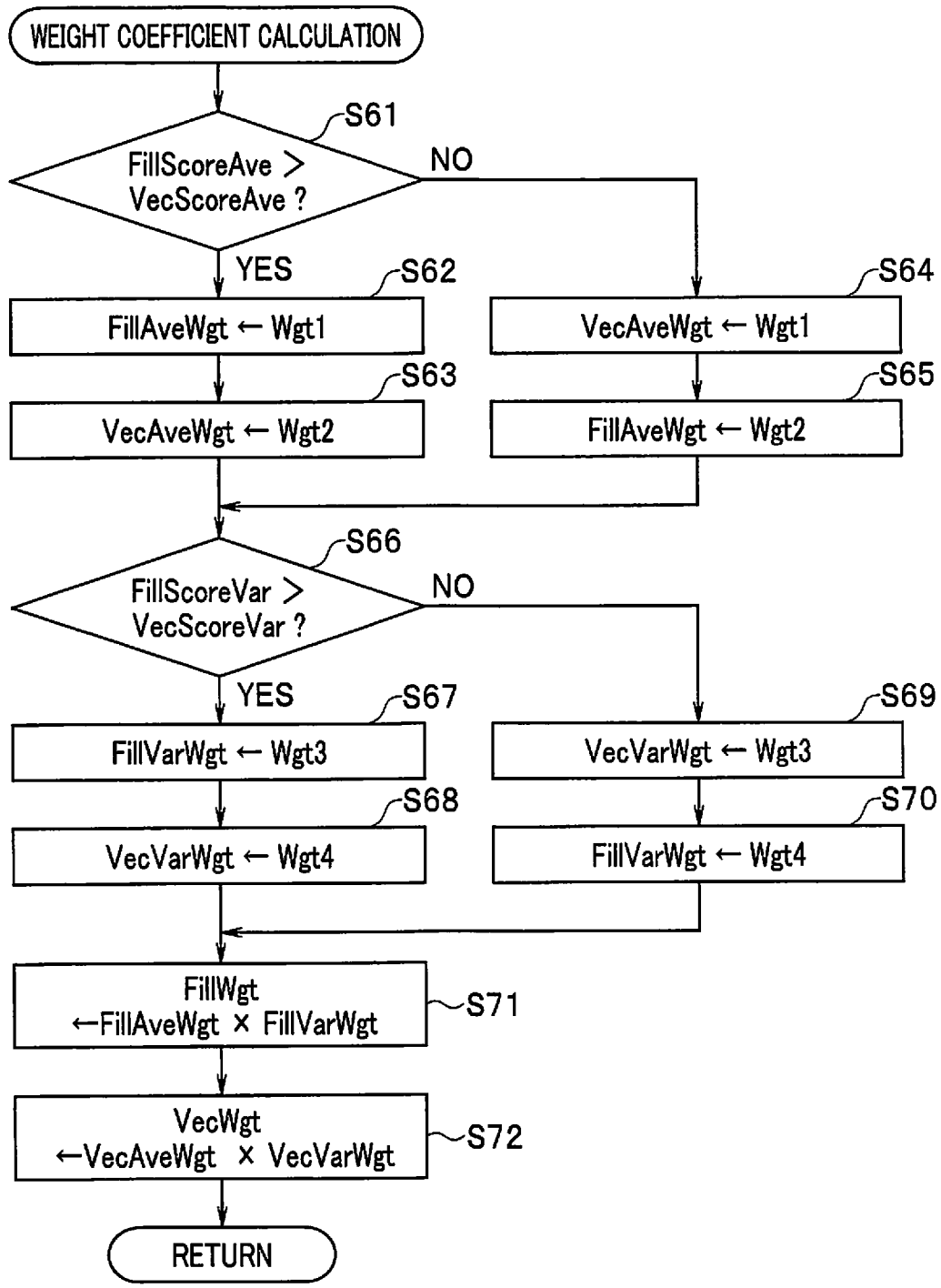
FIG. 24 is a flowchart illustrating details of weight coefficient calculation processing in step S35 illustrated in FIG. 21 in the third embodiment.

FIG. 24 is a flowchart illustrating details of the weight coefficient calculation processing in step S35 illustrated in FIG. 21.

When the processing is started, the weight coefficient calculation unit 14 judges whether or not the average value FillScoreAve of the pixel filling rate evaluation values is more than the average value VecScoreAve of the motion vector evaluation values (step S61).

If it is judged in step S61 that FillScoreAve is more than VecScoreAve, the weight coefficient calculation unit 14 sets Wgt1 as a weight coefficient FillAveWgt based on the average value FillScoreAve of the pixel filling rate evaluation values (step S62) while setting Wgt2 as a weight coefficient VecAveWgt based on the average value VecScoreAve of the motion vector evaluation values (step S63). Wgt1 and Wgt2 are respectively positive values satisfying a relationship of Wgt1>Wgt2.

If it is judged in step S61 that FillScoreAve is not more than VecScoreAve, the weight coefficient calculation unit 14 sets Wgt1 as the weight coefficient VecAveWgt based on the average value VecScoreAve of the motion vector evaluation values (step S64) while setting Wgt2 as the weight coefficient FillAveWgt based on the average value FillScoreAve of the pixel filling rate evaluation values (step S65).

The weight coefficient calculation unit 14 then judges whether or not the variance value FillScoreVar of the pixel filling rate evaluation values is more than the variance value VecScoreVar of the motion vector evaluation values (step S66).

If it is judged in step S66 that FillScoreVar is more than VecScoreVar, the weight coefficient calculation unit 14 sets Wgt3 as a weight coefficient FillVarWgt based on the variance value FillScoreVar of the pixel filling rate evaluation values (step S67) while setting Wgt4 as a weight coefficient VecVarWgt based on the variance value VecScoreVar of the motion vector evaluation values (step S68). Wgt3 and Wgt4 are respectively positive values satisfying a relationship of Wgt3>Wgt4.

Note that Wgt1, and Wgt3 and Wgt2 and Wgt4 may be respectively the same values or may be different values.

If it is judged in step S66 that FillScoreVar is not more than VecScoreVar, the weight coefficient calculation unit 14 sets Wgt3 as a weight coefficient VecVarWgt based on the variance value VecScoreVar of the motion vector evaluation values (step S69) while setting Wgt4 as a weight coefficient FillVarWgt based on the variance value FillScoreVar of the pixel filling rate evaluation values (step S70).

Then, the weight coefficient calculation unit 14 sets a first weight coefficient FillWgt for the pixel filling rate evaluation value FillScore[i], as expressed by an equation 12 (step S71).

$$FillWgt \leftarrow FillAveWgt \times FillVarWgt \quad \text{[Equation 12]}$$

Further, the weight coefficient calculation unit 14 sets a second weight coefficient VecWgt for the motion vector evaluation value VecScore[i], as expressed by an equation 13 (step S72).

$$VecWgt \leftarrow VecAveWgt \times VecVarWgt \quad \text{[Equation 13]}$$

Then, the processing returns to the processing illustrated in FIG. 21.

Figure 25:
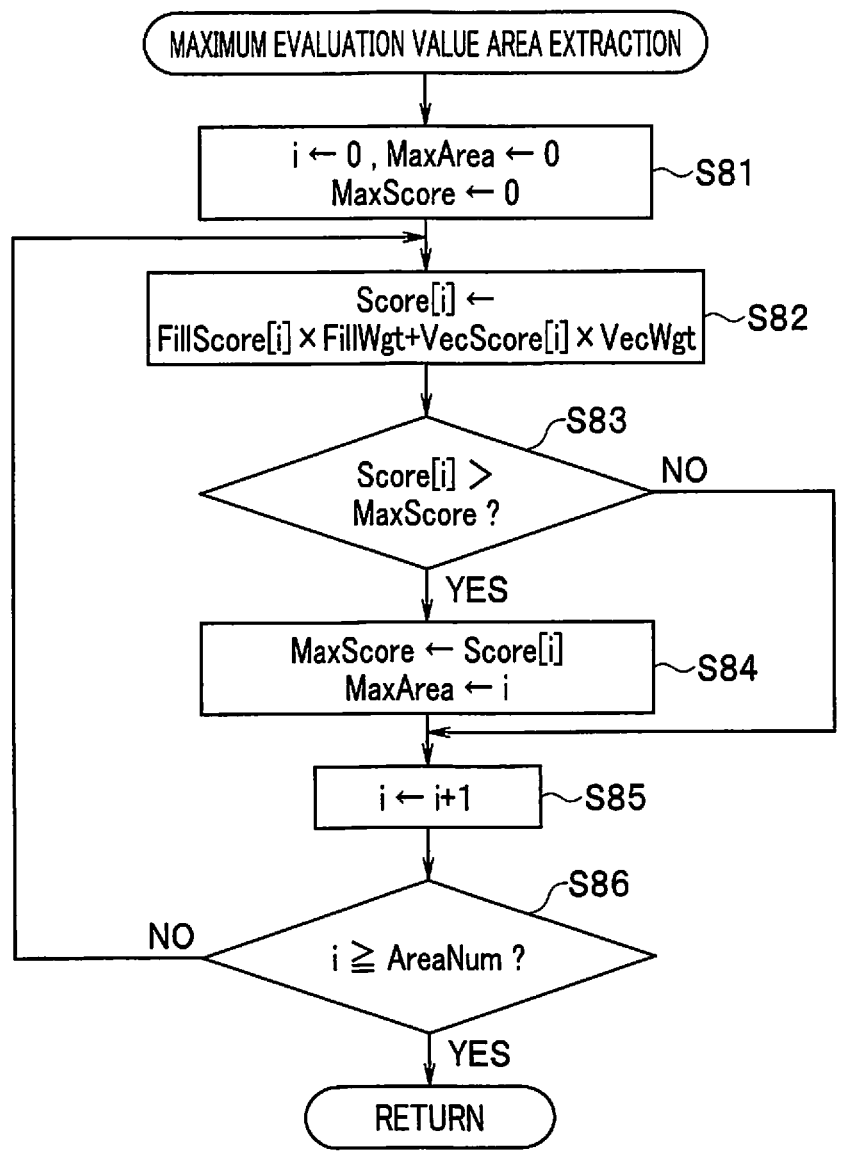
FIG. 25 is a flowchart illustrating details of maximum evaluation value area extraction processing in step S36 illustrated in FIG. 21 in the third embodiment.

FIG. 25 is a flowchart illustrating details of the maximum evaluation value area extraction processing in step S36 illustrated in FIG. 21.

When the processing is started, the determination unit 6 initializes a parameter. Zero is set as the area number i for counting the number of evaluation areas, zero is set as a maximum evaluation value area number MaxArea, and zero is set as a maximum value MaxScore of overall evaluation values (step S81).

Then, the determination unit 6 sets an overall evaluation value Score[i] for the evaluation area assigned the area number i, as expressed by an equation 14 (step S82).

$$Score[i] \leftarrow FillScore[i] \times FillWgt + VecScore[i] \times VecWgt \quad \text{[Equation 14]}$$

Then, the determination unit 6 judges whether or not the overall evaluation value Score[i] for the evaluation area assigned the area number i is more than the maximum value MaxScore of the current overall evaluation values (step S83).

If it is judged in step S83 that Score[i] is more than MaxScore, the determination unit 6 sets Score[i] as MaxScore while setting a value of the area number i as the maximum evaluation value area number MaxArea (step S84).

If a process in step S84 is performed or if it is judged in step S83 that Score[i] is not more than MaxScore, the determination unit 6 increases the value of the area number i by one (step S85).

The determination unit 6 judges whether or not the area number i has reached the number of evaluation areas AreaNum (step S86).

If it is judged in step S86 that the area number i has not reached the number of evaluation areas AreaNum, the processing returns to step S82, described above. In step S82, the above-described processing is performed for the subsequent evaluation area.

If it is judged in step S86 that the area number i has reached the number of evaluation areas AreaNum, the determination unit 6 determines the evaluation area indicated by the maximum evaluation value area number MaxArea as a determination area, and the processing returns to the processing illustrated in FIG. 21.

Note that in processes in steps S83 and S84, described above, when the plurality of evaluation areas for which the overall evaluation value Score[i] reaches a maximum value exist, a value of the area number i assigned to the evaluation area first found is set as the maximum evaluation value area number MaxArea, to determine a determination area. However, it is needless to say that the present invention is not limited to this.

That is, if the plurality of evaluation areas for which the overall evaluation value Score[i] reaches a maximum value exist, the determination unit 6 may select any one of the evaluation areas as a determination area or may set all of the one or more evaluation areas for which the overall evaluation value Score[i] reaches a maximum value, respectively, as determination areas, for example.

Although a case where the pixel filling rate evaluation value and the motion vector evaluation value are used and a case where the pixel filling rate evaluation value and the spatial frequency evaluation value are used have been described above, three values, i.e., the pixel filling rate evaluation value, the motion vector evaluation value, and the spatial frequency evaluation value may be used. At this time, a value obtained by weighting and adding the pixel filling rate evaluation value, the motion vector evaluation value, and the spatial frequency evaluation value may be set as an overall evaluation value.

Further, in the determination unit 6, although the evaluation area for which the overall evaluation value reaches a maximum value is set as a determination area in the foregoing, the present invention is not limited to this. A determination area may be determined in response to an operation input from the operation unit 7. For example, the determination unit 6 sets the evaluation area for which the overall evaluation value reaches a maximum value as a determination area if a specific user operation has not been performed, sets the evaluation area for which the overall evaluation value reaches a second largest value as a determination area if the specific user operation has been performed once, and sets the evaluation area for which the overall evaluation value reaches a third largest value as a determination area if the specific user operation has been performed two times.

According to the third embodiment, a similar effect to the respective effects in the above-described first and second embodiments is produced while a value obtained by weighting and adding the pixel filling rate evaluation value and the motion vector evaluation value (or the spatial frequency evaluation value) is set as the overall evaluation value to determine the evaluation area for which the overall evaluation value reaches a maximum value as a determination area. Accordingly, the composite image is appropriately generated, and the evaluation area where a higher resolution has been actually achieved can be appropriately determined as a determination area.

At this time, the weight coefficient is calculated based on the average value and the variance value of the evaluation values. Accordingly, a determination area can be appropriately determined not only depending on whether the evaluation values throughout the evaluation areas are each large or small but also to which degree the evaluation values are aligned throughout the evaluation areas.

When at least one of judgment that the average value of the pixel filling rate evaluation values is a value outside the fourth predetermined range and judgment that the average value of the motion vector evaluation values is a value outside the fifth predetermined range holds, the area extraction range and the plurality of evaluation areas are reset. Accordingly, an area where both the pixel filling rate evaluation value and the motion vector evaluation value are high can be selected as a determination area.

Similarly, when at least one of judgment that the average value of the pixel filling rate evaluation values is a value outside the fourth predetermined range and judgment that the average value of the spatial frequency evaluation values is a value outside a 5'-th predetermined range holds, the area extraction range and the plurality of evaluation areas are reset. Accordingly, the area where both the pixel filling rate evaluation value and the spatial frequency evaluation value are high can be selected as a determination area.

Note that the processing in each of the above-described units may be performed by one or more processors configured as hardware. For example, each of the units may be a processor configured as an electronic circuit, or may be a circuit unit in a processor configured by an integrated circuit such as an FPGA (feld programmable gate array). Alternatively, a processor constituted by one or more CPUs (central processing units) may execute a function as each of the units by reading and executing a computer program recorded on a recording medium.

While the image processing apparatus has been mainly described above, the present invention may be directed to an image processing method for performing similar processing to the processing of the image processing apparatus, an image processing program as a computer program for causing a computer to perform similar processing to the processing of the image processing apparatus, and a non-transitory computer-readable recording medium storing the computer program, for example.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing apparatus that synthesizes a plurality of images consecutively photographed to generate a composite image having a higher resolution than respective resolutions of the plurality of images, the image processing apparatus comprising:
a pixel shifting super-resolution image generation circuit configured to align and arrange, for each of the plurality of images, a plurality of pixels constituting the image in a high-resolution image space for configuring the composite image, to generate the composite image;
an evaluation area setting circuit configured to set, for the composite image, an area extraction range while setting a plurality of evaluation areas within the area extraction range;
a synthesis accuracy evaluation circuit configured to evaluate, for each of the plurality of evaluation areas, a pixel filling rate for the evaluation area and calculate a plurality of pixel filling rate evaluation values; and
a determination circuit configured to determine a determination area from among the plurality of evaluation areas based on the plurality of pixel filling rate evaluation values.

2. The image processing apparatus according to claim 1, wherein
the synthesis accuracy evaluation circuit judges whether or not a maximum pixel filling rate evaluation value among the plurality of pixel filling rate evaluation values is a value within a first predetermined range, and causes the evaluation area setting circuit to reset the area extraction range and the plurality of evaluation areas when the maximum pixel filling rate evaluation value is not a value within the first predetermined range, and the synthesis accuracy evaluation circuit processes the reset plurality of evaluation areas again.

3. The image processing apparatus according to claim 2, wherein the determination circuit determines the evaluation area having the maximum pixel filling rate evaluation value as the determination area when the synthesis accuracy evaluation circuit judges that the maximum pixel filling rate evaluation value is a value within the first predetermined range.

4. The image processing apparatus according to claim 1, wherein the synthesis accuracy evaluation circuit acquires motion vectors for only specific evaluation areas for which the pixel filling rate evaluation value is a value within a second predetermined range among the plurality of evaluation areas and evaluates the acquired motion vectors, to calculate a motion vector evaluation value for each of the specific evaluation areas, and the determination circuit further determines the determination area from among the specific evaluation areas for which the pixel filling rate evaluation value is a value within the second predetermined range based on the motion vector evaluation values.

5. The image processing apparatus according to claim 4, wherein the synthesis accuracy evaluation circuit judges whether or not a maximum motion vector evaluation value among the motion vector evaluation values is a value within a third predetermined range, and causes the evaluation area setting circuit to reset the area extraction range and the plurality of evaluation areas when the maximum motion vector evaluation value is not a value within the third predetermined range, and the synthesis accuracy evaluation circuit processes the reset plurality of evaluation areas again.

6. The image processing apparatus according to claim 5, wherein the determination circuit determines the evaluation area having the maximum motion vector evaluation value as the determination area when the synthesis accuracy evaluation circuit judges that the maximum motion vector evaluation value is a value within the third predetermined range.

7. The image processing apparatus according to claim 1, wherein the synthesis accuracy evaluation circuit evaluates, for each of the plurality of evaluation areas, a motion vector for the evaluation area and further calculates a plurality of motion vector evaluation values, calculates an average value and a variance value of the plurality of pixel filling rate evaluation values while calculating an average value and a variance value of the plurality of motion vector evaluation values, calculates, based on the average value and the variance value of the pixel filling rate evaluation values and the average value and the variance value of the motion vector evaluation values, a first weight coefficient for each of the pixel filling rate evaluation values and a second weight coefficient for each of the motion vector evaluation values, and sets a value obtained by adding the pixel filling rate evaluation value multiplied by the first weight coefficient and the motion vector evaluation value multiplied by the second weight coefficient as an overall evaluation value, to calculate the overall evaluation value for each of the plurality of evaluation areas, and the determination circuit determines the evaluation area for which the overall evaluation value reaches a maximum value as the determination area.

8. The image processing apparatus according to claim 7, wherein the synthesis accuracy evaluation circuit causes the evaluation value setting circuit to reset the area extraction range and the plurality of evaluation areas when at least one of judgment that the average value of the pixel filling rate evaluation values is a value outside a fourth predetermined range and judgment that the average value of the motion vector evaluation values is a value outside a fifth predetermined range, and the synthesis accuracy evaluation circuit processes the reset plurality of evaluation areas again.

9. The image processing apparatus according to claim 4, wherein a spatial frequency for the evaluation area is calculated and used instead of the motion vector.

10. The image processing apparatus according to claim 1, further comprising a display configured to display the determination area determined by the determination circuit.

11. A non-transitory computer-readable recording medium storing a computer program, wherein the computer program is a program for causing a computer to perform image processing for synthesizing a plurality of images consecutively photographed to generate a composite image having a higher resolution than respective resolutions of the plurality of images, and the computer is caused to perform:

aligning and arranging, for each of the plurality of images, a plurality of pixels constituting the image in a high-resolution image space for configuring the composite image, to generate the composite image;

setting, for the composite image, an area extraction range while setting a plurality of evaluation areas within the area extraction range;

evaluating, for each of the plurality of evaluation areas, a pixel filling rate for the evaluation area and calculating a plurality of pixel filling rate evaluation values; and determining a determination area from among the plurality of evaluation areas based on the plurality of pixel filling rate evaluation values.

12. An image processing method for synthesizing a plurality of images consecutively photographed to generate a composite image having a higher resolution than respective resolutions of the plurality of images, the image processing method comprising:

aligning and arranging, for each of the plurality of images, a plurality of pixels constituting the image in a high-resolution image space for configuring the composite image, to generate the composite image;

setting, for the composite image, an area extraction range while setting a plurality of evaluation areas within the area extraction range;

evaluating, for each of the plurality of evaluation areas, a pixel filling rate for the evaluation area and calculating a plurality of pixel filling rate evaluation values; and determining a determination area from among the plurality of evaluation areas based on the plurality of pixel filling rate evaluation values.

* * * * *